United States Patent
Lee et al.

(10) Patent No.: US 10,321,145 B2
(45) Date of Patent: Jun. 11, 2019

(54) METHOD AND DEVICE FOR ENCODING OR DECODING IMAGE BY MEANS OF VIEW MERGING PREDICTION

(71) Applicant: SAMSUNG ELECTRONICS CO., LTD., Suwon-si (KR)

(72) Inventors: Jin-young Lee, Suwon-si (KR); Min-woo Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/517,759

(22) PCT Filed: Oct. 7, 2015

(86) PCT No.: PCT/KR2015/010604
§ 371 (c)(1),
(2) Date: Apr. 7, 2017

(87) PCT Pub. No.: WO2016/056842
PCT Pub. Date: Apr. 14, 2016

(65) Prior Publication Data
US 2017/0310984 A1 Oct. 26, 2017

Related U.S. Application Data

(60) Provisional application No. 62/060,712, filed on Oct. 7, 2014.

(51) Int. Cl.
*H04N 19/31* (2014.01)
*H04N 19/463* (2014.01)
(Continued)

(52) U.S. Cl.
CPC ........... *H04N 19/463* (2014.11); *H04N 19/31* (2014.11); *H04N 19/513* (2014.11); *H04N 19/52* (2014.11); *H04N 19/597* (2014.11); *H04N 19/70* (2014.11)

(58) Field of Classification Search
None
See application file for complete search history.

(56) References Cited

U.S. PATENT DOCUMENTS 9,456,217 B2  9/2016 Sugio et al.
9,525,888 B2  12/2016 Yin et al.
(Continued)

FOREIGN PATENT DOCUMENTS

EP  3 163 880 A1  5/2017
JP  2017-525201 A  8/2017
(Continued)

OTHER PUBLICATIONS

Jin Young Lee et al., "Proposed text for JCT3V-D0117", Joint Collaborative Team on 3D Video Coding Extensions of ITU-T SG 16 WP 3 and ISO/IEC JTC 1/SC 29/WG 11 4th Meeting, Incheon, KR, Apr. 20-26, 2013, Document: JCT3V-D0117, total 8 pages.
(Continued)

*Primary Examiner* — Mark Roz
(74) *Attorney, Agent, or Firm* — Sughrue Mion, PLLC

(57) ABSTRACT

According to an embodiment, an image decoding method includes: determining at least one prediction unit included in a current coding unit that is one of at least one coding unit splitting the image; generating a merge candidate list related to a current prediction unit included in the at least one prediction unit; determining a prediction mode to be performed in the prediction unit based on the merge candidate list; and performing prediction according to the determined prediction mode, wherein the generating of the merge candidate list further comprises determining whether to add a view synthesis prediction merging candidate to the merge candidate list based on whether a neighboring prediction unit adjacent to the current prediction unit has been encoded using the view synthesis prediction merging candidate.

9 Claims, 29 Drawing Sheets

(51) Int. Cl.
*H04N 19/597* (2014.01)
*H04N 19/513* (2014.01)
*H04N 19/52* (2014.01)
*H04N 19/70* (2014.01)

(56) References Cited

U.S. PATENT DOCUMENTS

| | | | |
|---|---|---|---|
| 2013/0242046 | A1 | 9/2013 | Zhang et al. |
| 2014/0286423 | A1 | 9/2014 | Chen et al. |
| 2015/0103897 | A1 | 4/2015 | Kim et al. |
| 2016/0073132 | A1* | 3/2016 | Zhang .......... H04N 19/597 375/240.12 |
| 2016/0255361 | A1 | 9/2016 | Lim et al. |
| 2017/0048539 | A1 | 2/2017 | Kim et al. |
| 2017/0127041 | A1 | 5/2017 | Bang et al. |

FOREIGN PATENT DOCUMENTS

| | | |
|---|---|---|
| KR | 10-2013-0043651 A | 4/2013 |
| KR | 10-1350597 B1 | 1/2014 |
| KR | 10-2014-0049494 A | 4/2014 |
| KR | 10-2014-0053052 A | 5/2014 |
| KR | 10-2014-0057684 A | 5/2014 |
| WO | 2012160803 A1 | 11/2012 |
| WO | 2013/154869 A1 | 10/2013 |
| WO | 2014/153382 A1 | 9/2014 |
| WO | 2015/190510 A1 | 12/2015 |
| WO | 2016003074 A1 | 1/2016 |

OTHER PUBLICATIONS

Feng Zou, et al., "View Sysnthesis Prediction Using Skip and Merge Candidates for HEVC-based 3D Video Coding", IEEE International Symposium on Circuits and Systems (ISCAS), IEEE, May 19, 2013, total 5 pages, URL http://ieeexplore.ieee.org/stamp/stamp.jsp?arnumber=6571781.

Ying Chen, et al., "Test Model 9 of 3D-HEVC and MV-HEVC", Joint Collaborative Team on 3D Video Coding Extension Development of ITU-T SG 16 WP 3 and ISO/IEC JTC 1/SC29/WG 11 9th Meeting, Sapporo, JP, Jul. 3-9, 2014, Document: JCT3V-I1003, total 9 pages.

Yichen Zhang, et al., "Simplification for VSP-related Merge Candidate List Construction", Joint Collaborative Team on 3D Video Coding Extensions of ITU-T SG 16 WP 3 and ISO/IEC JTC 1/SC 29/WG 11 9th Meeting, Sapporo, JP, Jul. 3-9, 2014, Document: JCT3V-I0112r1, total 5 pages.

Communication dated Feb. 20, 2018, issued by the Japanese Patent Office in counterpart Japanese application No. 2017-518538.

Communication dated Jan. 19, 2016 issued by the International Searching Authority in counterpart International Patent Application No. PCT/KR2015/010604 (PCT/ISA/210).

Communication dated Jan. 19, 2016 issued by the International Searching Authority in counterpart International Patent Application No. PCT/KR2015/010604 (PCT/ISA/237).

Communication issued by the European Patent Office dated Jul. 31, 2017 in counterpart European Patent Application No. 15849689.3.

Jin Young Lee et al., "3D-CE1.h related: Simplification of VSP insertion process", Joint Collaborative Team on 3D Video Coding Extensions of ITU-T SG 16 WP 3 and ISO/IEC JTC 1/SC 29/WG 11, 4th Meeting, Apr. 20-26, 2013, pp. 1-5, Incheon, Korea, Document: JCT3V-D0117, XP030130781.

Gerhard Tech et al., "3D-HEVC Draft Text 5", Joint Collaborative Team on 3D Video Coding Extensions of ITU-T SG 16 WP 3 and ISO/IEC JTC 1/SC 29/WG 11, 9th Meeting, Jul. 3-9, 2014, pp. i-90 (total 94 pages), Sapporo, Japan, Document: JCT3V-I1001-v3, XP030132529.

Jin Young Lee et al., "Removal of redundant VSP candidates in Merge mode", Joint Collaborative Team on 3D Video Coding Extensions of ITU-T SG 16 WP 3 and ISO/IEC JTC 1/SC 29/WG 11, 10th Meeting, Oct. 18-24, 2014, pp. 1-3, Strasbourg, France, Document: JCT3V-J0039, XP030132576.

Lee, et al., "3D-CE1: Simplification of 3D Merge list construction", 2014, Joint Collaborative Team on 3D Video Coding Extensions of ITU-T SG 16 WP 3 and ISO/IEC JTC 1/SC 29/WG 11, JCT3V-H0097, 6 pages total.

Liu, et al., "Simplifications for 3D-HEVC merge candidate list generation", 2014, Joint Collaborative Team on 3D Video Coding Extensions of ITU-T SG 16 WP 3 and ISO/IEC JTC 1/SC 29/WG 11, JCT3V-I0053, 8 pages total.

Ikai, et al., "Further VSP inheritance simplification", 2014, Joint Collaborative Team on 3D Video Coding Extensions of ITU-T SG 16 WP 3 and ISO/IEC JTC 1/SC 29/WG 11, JCT3V-I0106, 3 pages total.

Communication dated Jun. 19, 2018, issued by the Japanese Patent Office in counterpart Japanese Patent Application No. 2017-518538.

* cited by examiner

REFERENCE DEPTH PICTURE

REFERENCE TEXTURE PICTURE

CURRENT TEXTURE PICTURE

FIG. 6A

Derivation proecss for luma motion vectors for merge mode

...

7. The merging candidate list extMergeCandList is constructed as follows:

```
i = 0
if( availableFlagT )
    extMergeCandList[ i++ ] = T
if( availableFlagIV && ( !availableFlagT || differentMotion( T, IV ) ) )
    extMergeCandList[ i++ ] = IV
N = DepthFlag ? T : IV
if( availableFlagA1 && ( !availableFlagN || differentMotion( N, A1 ) ) )    — 61a
    extMergeCandList[ i++ ] = A1                                              — 61b
if( availableFlagB1 && ( !availableFlagN || differentMotion( N, B1 ) ) )
    extMergeCandList[ i++ ] = B1
if( availableFlagVSP && ( !availableFlagA1 || !VspMcFlag[ xPb − 1 ][ yPb + nPbH − 1] ) && i < MaxNumMergeCand )  — 62a
    extMergeCandList[ i++ ] = VSP                                             — 62d                                        — 62c
if( availableFlagB0 )                                                                                                       — 62b
    extMergeCandList[ i++ ] = B0
if( availableFlagDI && ( !availableFlagA1 || differentMotion( A1, DI ) ) &&
    ( !availableFlagB1 || differentMotion( B1, DI ) ) && ( i < MaxNumMergeCand ) )
    extMergeCandList[ i++ ] = DI
```

FIG. 6B

Derivation process for luma motion vectors for merge mode

...

The motion vectors mvL0 and mvL1, the reference indices refIdxL0 and refIdxL1, and the prediction utilization flags predFlagL0 and predFlagL1 are derived by the following ordered steps:

...

10. When [availableFlagVSP] is equal to 1, [N is equal to A1], and [VspMcFlag[ xPb − 1 ][ yPb + nPbH − 1 ]] is equal to 1, N is set equal to VSP.

...

PARTITION TYPE (800)

PREDICTION MODE (810)

SIZE OF TRANSFORMATION UNIT (820)

CODING UNIT (1010)

METHOD AND DEVICE FOR ENCODING OR DECODING IMAGE BY MEANS OF VIEW MERGING PREDICTION

TECHNICAL FIELD

The present invention relates to a method and apparatus for improving encoding or decoding performance by efficiently managing a merge candidate list in the process of encoding or decoding an image.

BACKGROUND ART

As hardware for reproducing and storing high resolution or high quality image content is being developed and supplied, a need for a video codec for effectively encoding or decoding the high resolution or high quality image content is increasing. According to a video codec of the related art, a video is encoded according to a limited encoding method based on coding units of a tree structure.

Image data of a spatial domain is transformed into coefficients of a frequency domain via frequency transformation. According to a video codec, an image is split into blocks of a predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

An encoding or decoding method that generates a merge candidate list is used to determine a prediction mode for compressing a current prediction unit included in a current coding unit. The merge candidate list may include a temporal merging candidate, a spatial merging candidate, a view synthesis prediction (VSP) merging candidate, and the like.

According to the related art, view synthesis prediction is used to determine whether blocks corresponding to all spatial merging candidates neighboring a current prediction unit have been encoded, so as to add a view synthesis prediction merging candidate to a merge candidate list. However, since the process of generating the merge candidate list requires an unnecessary calculation, image compression efficiency may be deteriorated.

DETAILED DESCRIPTION OF THE INVENTION

Technical Problem

There is a need to omit an unnecessary process of determining whether all spatial merging candidates neighboring a current prediction unit have been encoded, by using view synthesis prediction, so as to generate a merge candidate list including a candidate for view synthesis prediction during image encoding or decoding.

Technical Solution

According to an embodiment for solving technical problems, an image decoding method may include: determining at least one prediction unit included in a current coding unit that is one of at least one coding unit splitting the image; generating a merge candidate list related to a current prediction unit included in the at least one prediction unit; determining a prediction mode to be performed in the prediction unit based on the merge candidate list; and performing prediction according to the determined prediction mode, wherein the generating of the merge candidate list further comprises determining whether to add a view synthesis prediction merging candidate to the merge candidate list based on whether a neighboring prediction unit adjacent to the current prediction unit has been encoded using the view synthesis prediction merging candidate.

According to an embodiment for solving technical problems, an image decoding apparatus may include: a decoder configured to determine at least one prediction unit included in a current coding unit that is one of at least one coding unit splitting the image, generate a merge candidate list related to a current prediction unit included in the at least one prediction unit, determine a prediction mode to be performed in the prediction unit based on the merge candidate list, and perform prediction according to the determined prediction mode, wherein the decoder is further configured to determine whether to add a view synthesis prediction merging candidate to the merge candidate list based on whether a neighboring prediction unit adjacent to the current prediction unit has been encoded using the view synthesis prediction merging candidate.

According to an embodiment for solving technical problems, a non-transitory computer-readable recording medium having recorded thereon a program for performing the image decoding method may be provided.

Advantageous Effects of the Invention

Image compression efficiency may be improved by omitting an unnecessary process of determining whether all spatial merging candidates neighboring a current prediction unit have been encoded, by using view synthesis prediction.

DESCRIPTION OF THE DRAWINGS

FIG. 6A illustrates a process of generating a merge candidate list, according to an embodiment.

FIG. 6B illustrates a process of determining a prediction mode with respect to a current prediction unit according to whether a neighboring block of a current prediction unit has used view synthesis prediction, according to an embodiment.

BEST MODE

Figure 1A:
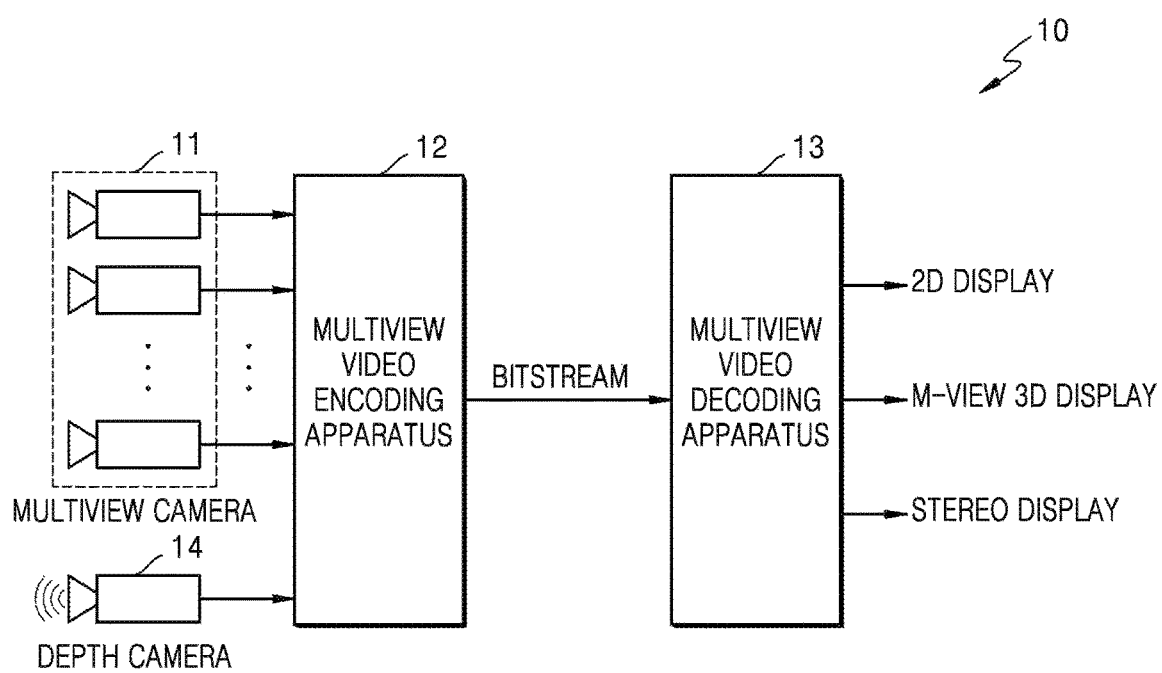
FIG. 1A illustrates a multiview video system according to an embodiment.

According to an embodiment, an image decoding method may include: determining at least one prediction unit included in a current coding unit that is one of at least one coding unit splitting the image; generating a merge candidate list related to a current prediction unit included in the at least one prediction unit; determining a prediction mode to be performed in the prediction unit based on the merge candidate list; and performing prediction according to the determined prediction mode, wherein the generating of the merge candidate list further comprises determining whether to add a view synthesis prediction merging candidate to the merge candidate list based on whether a neighboring prediction unit adjacent to the current prediction unit has been encoded using the view synthesis prediction merging candidate.

The neighboring prediction unit may be adjacent to a left side of the current prediction unit among spatial merging candidates.

The generating of the merge candidate list may further include determining whether the neighboring prediction unit is available as a spatial merging candidate.

When the neighboring prediction unit is available as a spatial merging candidate and the neighboring prediction unit has been encoded using the view synthesis prediction merging candidate, the generating of the merge candidate list may include generating a merge candidate list including the view synthesis prediction merging candidate instead of a spatial merging candidate related to the neighboring prediction unit in the current prediction unit.

The determining of the prediction mode may further include: determining whether the current prediction unit is to be predicted using a spatial merging candidate based on first information; and determining whether the neighboring prediction unit has been encoded using a view synthesis prediction merging candidate based on second information.

The determining of the prediction mode may include determining a prediction mode based on the merge candidate list including the view synthesis prediction merging candidate, when it is determined that the current prediction unit is predicted using the spatial merging candidate and the neighboring prediction unit has been encoded using the view synthesis prediction merging candidate.

When the neighboring prediction unit is unavailable as a spatial merging candidate or the neighboring prediction unit has been encoded without using the view synthesis prediction merging candidate, the generating of the merge candidate list may include generating a merge candidate list including the view synthesis prediction merging candidate in the current prediction unit.

When the neighboring prediction unit is unavailable as the spatial merging candidate or the neighboring prediction unit has been encoded without using the view synthesis prediction merging candidate, the generating of the merge candidate list may include performing an operation of adding the view synthesis prediction merging candidate to the merge candidate list after a first spatial merging candidate adjacent to a left side of the current prediction unit and a second spatial merging candidate adjacent to an upper end of the current prediction unit among spatial merging candidates are added to the merge candidate list.

According to an embodiment, an image decoding apparatus may include: a decoder configured to determine at least one prediction unit included in a current coding unit that is one of at least one coding unit splitting the image, generate a merge candidate list related to a current prediction unit included in the at least one prediction unit, determine a prediction mode to be performed in the prediction unit based on the merge candidate list, and perform prediction according to the determined prediction mode, wherein the decoder is further configured to determine whether to add a view synthesis prediction merging candidate to the merge candidate list based on whether a neighboring prediction unit adjacent to the current prediction unit has been encoded using the view synthesis prediction merging candidate.

The neighboring prediction unit may be adjacent to a left side of the current prediction unit among spatial merging candidates.

The decoder may be further configured to determine whether the neighboring prediction unit is available as a spatial merging candidate.

When the neighboring prediction unit is available as a spatial merging candidate and the neighboring prediction unit has been encoded using the view synthesis prediction merging candidate, the decoder may be further configured to generate a merge candidate list including the view synthesis prediction merging candidate instead of a spatial merging candidate related to the neighboring prediction unit in the current prediction unit.

The decoder may be further configured to determine whether the current prediction unit is to be predicted using a spatial merging candidate based on first information, and to determine whether the neighboring prediction unit has been encoded using a view synthesis prediction merging candidate based on second information.

The decoder may be further configured to determine a prediction mode based on the merge candidate list including the view synthesis prediction merging candidate, when it is determined that the current prediction unit is predicted using the spatial merging candidate and the neighboring prediction unit has been encoded using the view synthesis prediction merging candidate, and to determine a prediction mode based on the merge candidate list including the view synthesis prediction merging candidate, when it is determined that the current prediction unit is predicted using the spatial merging candidate and the neighboring prediction unit has been encoded using the view synthesis prediction merging candidate.

When the neighboring prediction unit is unavailable as a spatial merging candidate or the neighboring prediction unit has been encoded without using the view synthesis prediction merging candidate, the decoder may be further configured to generate a merge candidate list including the view synthesis prediction merging candidate in the current prediction unit.

When the neighboring prediction unit is unavailable as the spatial merging candidate or the neighboring prediction unit has been encoded without using the view synthesis prediction merging candidate, the decoder may be further configured to perform an operation of adding the view synthesis prediction merging candidate to the merge candidate list after a first spatial merging candidate adjacent to a left side of the current prediction unit and a second spatial merging candidate adjacent to an upper end of the current prediction unit among the spatial merging candidates are added to the merge candidate list.

According to an embodiment, a non-transitory computer-readable recording medium having recorded thereon a program for performing the image decoding method may be provided.

Mode of the Invention

Hereinafter, a method and apparatus for encoding or decoding an image by generating a merge candidate list for performing prediction by using a view synthesis prediction merging candidate, according to an embodiment, are proposed with reference to FIGS. 1A through 6B. Also, an image encoding method and an image decoding method based on coding units of a tree structure, according to an embodiment, which are applicable to the image encoding method and the image decoding method proposed above, are disclosed with reference to FIGS. 7 through 20. Also, embodiments to which the image encoding method and the image decoding method proposed above are applicable are disclosed with reference to FIGS. 21 through 27.

Hereinafter, an 'image' may indicate a still picture of a video or a moving picture, i.e., the video itself.

Hereinafter, a 'sample' means data that is allocated to a sampling position of an image and is a processing target. For example, pixel values in an image in a spatial domain or a residual of a block may be samples.

Hereinafter, a 'current block' may mean a block of an image to be encoded or decoded.

Hereinafter, a "neighboring block" indicates at least one encoded or decoded block adjacent to a current block. For example, the neighboring block may be located at an upper end of the current block, a right upper end of the current block, a left side of the current block, or a left upper end and a left lower end of the current block. Also, the neighboring block may include a temporal neighboring block as well as a spatial neighboring block. For example, a co-located block, which is a temporal neighboring block, may include a block located at the same position as a current block of a reference picture or a neighboring block thereof.

Hereinafter, a 'layer image' indicates images of a specific view or the same type. One layer image in a multiview video indicates texture images or depth images input at a specific view. For example, each of a left-view texture image, a right-view texture image, and a depth image in a three-dimensional (3D) image constitutes one layer image. That is, the left-view texture image may constitute a first layer image, the right-view texture image may constitute a second layer image, and the depth image may constitute a third layer image.

FIG. 1A illustrates a multiview video system according to an embodiment.

The multiview video system 10 may include a multiview video encoding apparatus 12 and a multiview video decoding apparatus 13. A bitstream is generated by encoding a multiview video image obtained through two or more multiview cameras 11, a depth image of the multiview image obtained through a depth camera 14, and camera parameter information related to the multiview cameras 11. The multiview video decoding apparatus 13 decodes the bitstream and provides a decoded multiview video frame in various types according to a viewer's demand. The multiview video decoding apparatus 13 of the multiview video system 10 may correspond to an image decoding apparatus 20 of FIG. 2A, and the multiview video encoding apparatus 12 may correspond to an image encoding apparatus 25 of FIG. 2B.

The multiview camera 11 is configured by connecting a plurality of cameras having different views and provides a multiview video image at each frame. In the following description, a color image obtained at each view according to a predetermined color format, such as a YUV format or a YCbCr format, may be referred to as a texture image.

The depth camera 14 provides a depth image that expresses depth information of a scene as an 8-bit image of 256 levels. The number of bits for expressing one pixel of the depth image is not limited to 8 bits and may be changed. The depth camera 14 may measure a distance from a camera to a subject and a background by using infrared ray and provide a depth image having a value proportional or inversely proportional to the distance. As described above, an image of one view includes a texture image and a depth image.

When the image encoding apparatus 25 encodes the texture image of the multiview and the corresponding depth image and transmits the texture image and the depth image, the multiview video decoding apparatus 13 may provide a 3D effect through a stereo image or a 3D image by using the texture image of the multiview and the depth image included in the bitstream and may also combine 3D images of a certain view desired by a viewer and provide the combined image. Information indicating whether information about the depth image is included in a data packet and information indicating whether each data packet is for a texture image, a depth image, or a image type may be included in a bitstream header of the multiview video data. According to hardware performance of a receiver side, when the depth image is used to reconstruct the multiview video, the multiview video is decoded by using the received depth image, and when hardware of the receiver side does not support the multiview video and thus the depth image cannot be used, the data packet received in relation to the depth image may be discarded. As such, when the multiview image of the receiver side cannot be displayed, an image of one view of the multiview image may be displayed as a two-dimensional (2D) image.

A data amount to be encoded in the multiview video data increases in proportion to the number of views, and the depth image for realizing a 3D effect needs to be encoded. Thus, as illustrated in FIG. 1A, it is necessary to efficiently compress a large amount of multiview video data so as to implement the multiview video system.

Figure 1B:
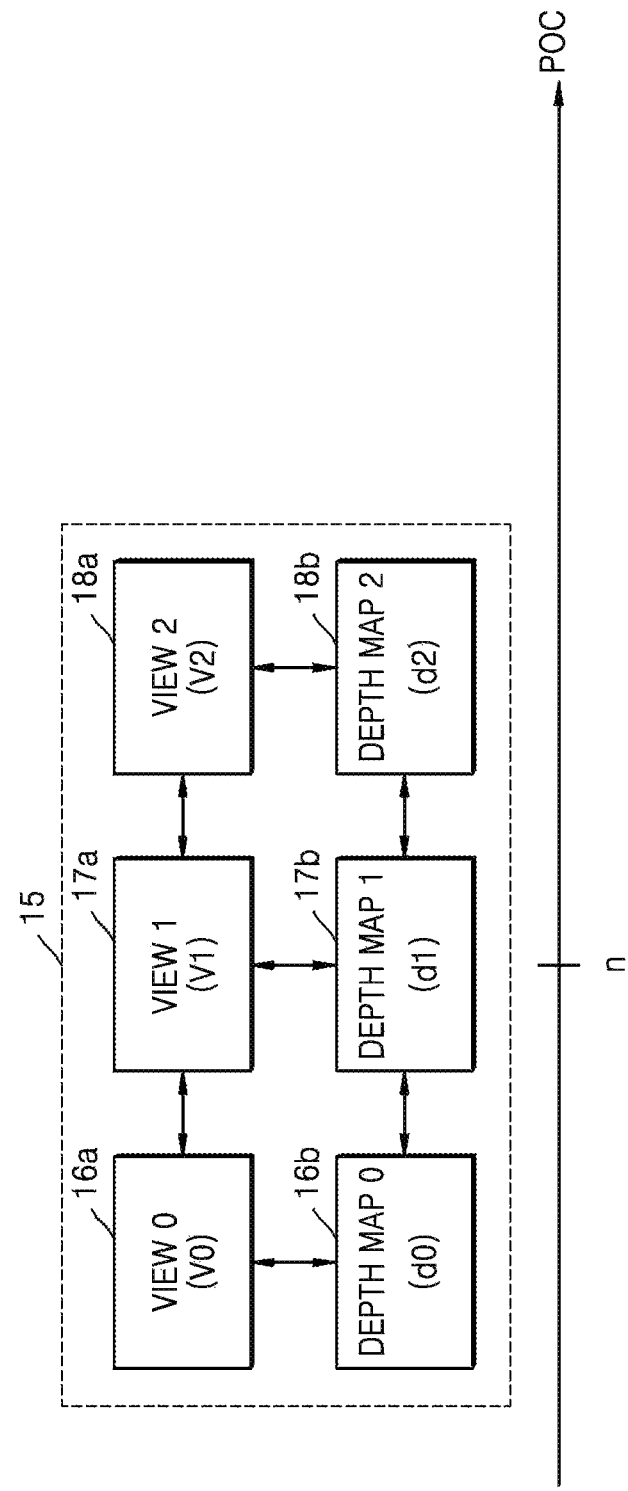
FIG. 1B is a diagram illustrating texture images and depth images constituting a multiview video.

FIG. 1B is a diagram illustrating texture images and depth images constituting a multiview video.

FIG. 1B illustrates a texture picture v0 16*a* of a first view (view 0), a depth image picture d0 16*b* corresponding to the texture picture v0 16*a* of the first view (view 0), a texture picture v1 17*a* of a second view (view 1), a depth image picture d1 17*b* corresponding to the texture picture v1 17*a* of the second view (view 1), a texture picture v2 18*a* of a third view (view 2), and a depth image picture d2 18*b* corresponding to the texture picture v2 18*a* of the third view (view 2). Although FIG. 1B illustrates the texture pictures (v0, v1, and v2) 16*a*, 17*a*, and 18*a* of the multiview at three views (view 0, view 1, and view 2) and the corresponding depth images (d0, d1, and d2) 16*b*, 17*b*, and 18*b*, the number of views is not limited thereto and may be changed. The texture pictures (v0, v1, and v2) 16*a*, 17*a*, and 18*a* of the multiview and the corresponding depth images (d0, d1, and d2) 16*b*, 17*b*, and 18*b* are pictures that are input at the same time and have the same picture order count (POC). In the following description, a picture group 15 having the same POC value of n (n is an integer) as the texture pictures (v0, v1, and v2) 16*a*, 17*a*, and 18*a* of the multiview and the corresponding depth image pictures (d0, d1, and d2) 16*b*, 17*b*, and 18*b* may be referred to as an n-th picture group 15 A picture group having the same POC may constitute one access unit. Encoding order of access units need not be necessarily the same as capture order (input order) or display order of images. The encoding order of access units may be different from the capture order or the display order by taking into account reference relationship.

A view identifier (ViewId), which is a view order index, may be used for specifying the view of the texture image of each view and the depth image. The texture image and the depth image of the same view have the same view identifier. The view identifier may be used to determine the encoding order. For example, the image encoding apparatus 25 may encode a multiview video in ascending order of values of view identifiers. That is, the image encoding apparatus 25 may encode a texture image and a depth image having ViewId of 0 and then encode a texture image and a depth image having ViewId of 1. When the encoding order is determined based on the view identifier as described above, error occurrence or non-occurrence of received data may be identified by using the view identifier in an environment where an error easily occurs. However, the encoding/decoding order of images of each view may be changed without depending on the magnitude order of the view identifiers.

Figure 2A:
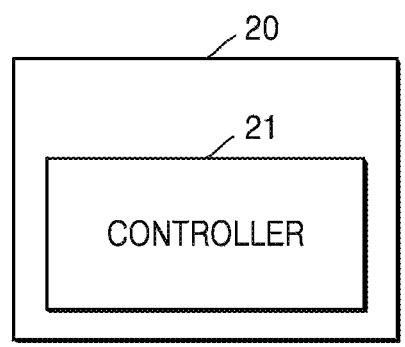
FIG. 2A is a block diagram of an image decoding apparatus according to an embodiment.

FIG. 2A is a block diagram of an image decoding apparatus 20 according to an embodiment. The image decoding apparatus 20 of FIG. 2A may correspond to the multiview video decoding apparatus 13 of FIG. 1A. The image decoding apparatus 20 according to an embodiment may include a controller 21. The controller 21 may split an image into a plurality of coding units so as to decode the image. In order to determine the coding unit, the controller 21 may first determine a maximum size of the coding unit. The controller 21 may determine the coding unit by splitting the image into a plurality of largest coding units according to the determined maximum size of the coding unit and then hierarchically splitting each of the largest coding units. According to an embodiment, information about the maximum size of the coding unit may be obtained from the bitstream through a bitstream obtainer (not illustrated), and the controller 21 may determine the maximum size of the coding unit based on the information about the maximum size.

Figure 3:
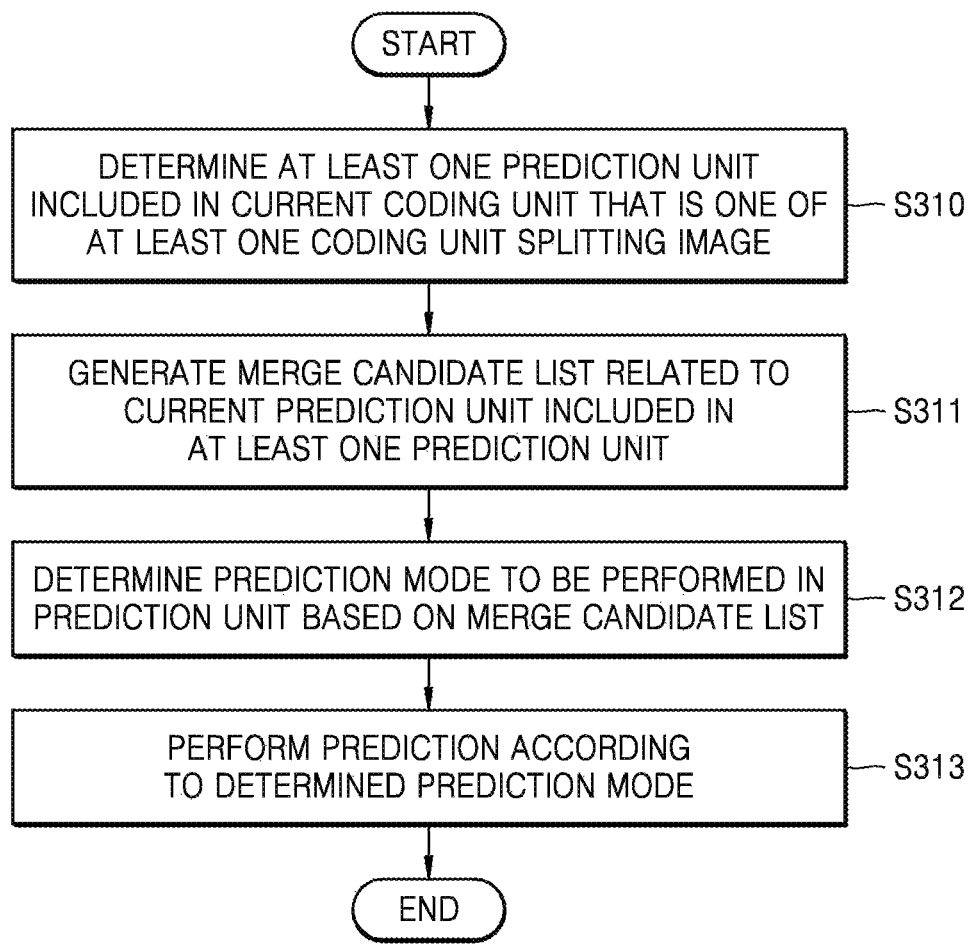
FIG. 3 is a flowchart of an image decoding method of performing prediction by generating a merge candidate list, according to an embodiment.

FIG. 3 is a flowchart of an image decoding method of performing prediction by generating a merge candidate list, according to an embodiment.

According to an embodiment, in operation S310, the controller 21 of the image decoding apparatus 20 may determine at least one prediction unit in the coding unit. A specific method of determining at least one prediction unit in the coding unit will be described below in detail.

The controller 21 performs prediction decoding on the texture image of the multiview and the depth image input thereto. The controller 21 uses prediction so as to reduce redundant information in the multiview image. Specifically, an intra predictor (not illustrated) predicts a current block with reference to reconstructed samples neighboring the current block. An inter predictor (not illustrated) performs inter prediction to generate a prediction value of the current block from previously encoded/decoded pictures. A prediction mode determiner (not illustrated) may determine a prediction mode of the current block based on information about the determined prediction mode by comparing costs of encoded result values among various intra prediction modes and inter prediction modes. The operations of the intra predictor (not illustrated), the inter prediction unit (not illustrated), and the prediction mode determiner (not illustrated) may be performed by the controller 21.

In the inter prediction, a process of finding an optimal prediction block from reference pictures is referred to as motion estimation. For more precise motion estimation, after interpolating a reconstructed picture according to a type of a video codec, motion estimation may be performed on the interpolated image in sub-pixel units. Motion compensation means generating a prediction block based on motion information (motion vector, reference picture index) about the optimal prediction block found in the motion estimation process. The controller 21 may find the optimal prediction block from the reference pictures through the motion estimation process and generate the prediction block through the motion compensation process.

The controller 21 may generate the prediction block of the current block through intra prediction or inter prediction. Also, the controller 21 performs inverse-transformation, inverse-quantization, and entropy decoding on each block so as to reconstruct a residual signal, which is a difference value between a prediction block and an original block, from a bitstream.

The image decoding apparatus 20 may obtain a bitstream including data related to a prediction-encoded multiview video. According to an embodiment, a bitstream obtainer (not illustrated) of the image decoding apparatus 20 may obtain, from the bitstream, a data packet generated by multiplexing in network adaptive layer (NAL) units as data related to the multiview video.

In order to decode intra-predicted image data, the image decoding apparatus 20 may obtain, from the bitstream, information about the prediction mode of the current block, information for specifying an intra prediction mode applied to the current block among intra prediction modes, and the residual signal that is the difference value between the current block and the prediction block. For example, the information about the intra prediction mode applied to the current block among a total of 35 intra prediction modes, that is, a DC mode, a planar mode, and 33 directional modes with directions, may be obtained from the bitstream as information about the current block intra-predicted based on HEVC.

In order to transmit inter-predicted image data, information about the prediction mode of the current block, information about a reference picture list, such as list 0 or list 1, index information (ref idx) indicating a reference picture used during the inter prediction of the current block among reference pictures included in the reference picture list, and information about a motion vector of the current block may be included in the bitstream. Also, the inter-predicted or intra-predicted current block may be prediction unit (PU). Specific encoding/decoding methods will be described below with reference to FIGS. 19 through 31.

An advanced motion vector prediction (AMVP) mode and a merge mode using correlation of motion information of the neighboring block and the current block may be used so as to reduce an amount of motion information transmitted during the inter prediction. Both of the merge mode and the AMVP mode are special cases of the inter prediction. In the merge mode and the AMVP mode, previous blocks temporally or spatially related to the current block are used as already reconstructed blocks. A list of previous blocks available for deriving motion information of the current block may be generated, and the image decoding apparatus 20 may obtain selection information of the previous block in the list. In the merge mode and the AMVP mode, the image decoding apparatus 20 obtains a candidate list of the previous block so as to retrieve motion information in the same process. In a skip mode, only selection block of a previous block in a merge candidate list may be transmitted without transmitting a residual signal. That is, in the skip mode, only index (merge index) information retrieving motion information in the merge candidate list is included in the bitstream and transmitted, and in the merge mode, the residual signal as well as the index information is included in the bitstream and transmitted.

As described above, the multiview image includes texture images and depth images input at a plurality of views. It is assumed that each of texture images and depth images input through one view constitutes one layer image. For example, in the case of a 3D video, each of a left-view texture image, a right-view texture image, a left-view depth image, and a right-view depth image constitutes one layer image. Also, in a 3D video, only one depth image may be used as a depth image, and a left-view depth image and a right-view depth image may be generated from camera parameter information according to a view difference between a left view and a right view. In such a case, each of the left-view texture image, the right-view texture image, and one depth image constitutes one layer image. Thus, the 3D video may include a total of three layer images.

High correlation exists between the images of the respective layers constituting the multiview image. For example, correlation may exist between the texture image and the depth image of the same view because the images at the same time and the same view are expressed as colors and depths. Also, a constant correlation may exist in texture images or depth images of different views input at the same time. Also, a constant correlation may exist in texture images and depth images of different views input at different times. Therefore, in the case of the multiview image, various available types of reference pictures may exist and inter prediction may be performed by using various methods. That is, inter prediction of a single-view image according to the related art is not limited to a case where inter prediction is performed only in a time direction, and inter prediction of a multiview image may be performed in a view direction as well as a time direction. Also, since correlation also exists between a texture image and a depth image corresponding to each other, each of the texture image and the depth image may be inter-predicted with reference to the other-party image. Generally, since a large amount of information is included in the texture image, the depth image may be inter-predicted with reference to the texture image.

Therefore, the inter predictor (not illustrated) according to an embodiment may perform inter-layer prediction of predicting a picture of a current layer from a picture of another layer by using various methods, by taking into account the correlation between pictures constituting the multiview video.

An image of a layer independently encoded/decoded without reference to an image of another layer is defined as an independent layer image, and an image of a layer encoded/decoded with reference an image of another layer is defined as a dependent layer image. The independent layer image may be encoded/decoded earlier than the dependent layer image, and the dependent layer image may be encoded/decoded with reference to the image of another layer previously encoded/decoded.

As described above, the merge mode is technology for deriving a reference direction, a reference picture index, and a motion vector predictor (MVP) value from the previous block processed before the current block. The motion vector value is determined based on the motion vector predictor value derived in the merge. The image decoding apparatus 20 may obtain a merge index corresponding to motion-selected merge block information.

According to an embodiment, in operation S311, the controller 21 of the image decoding apparatus 20 may generate a merge candidate list related to a current prediction unit included in at least one prediction unit. The controller 21 may use at least one of the following candidates as a merging candidate used in the merge mode. The merging candidate is not limited to the following candidates, and various types of candidates may be added thereto or omitted therefrom according to a prediction method. The merging candidate may be defined as a candidate for a prediction mode that can be performed on a current prediction block.

(1) Motion Parameter Inheritance Candidate
(2) Inter-View Candidate
(3) Spatial Candidate
(4) Disparity Candidate
(5) Temporal Candidate
(6) View Synthesis Prediction (VSP) Candidate Among them, (1) motion parameter inheritance candidate, (2) inter-view candidate, (3) spatial candidate, and (5) temporal candidate may be a previous block included in a layer image of different views from the current block as well as a layer image of the same view as the current block. (4) Disparity candidate and (6) view synthesis prediction candidate may be a previous block included in a layer image of different views from the current block.

A process of obtaining a disparity vector related to a current block will be described with reference to FIGS. 4A through 4D. However, since the process of obtaining the disparity vector, which will be described below, is merely an embodiment, various methods for obtaining the disparity vector related to the current block may be used for realizing the present invention.

Figure 4A:
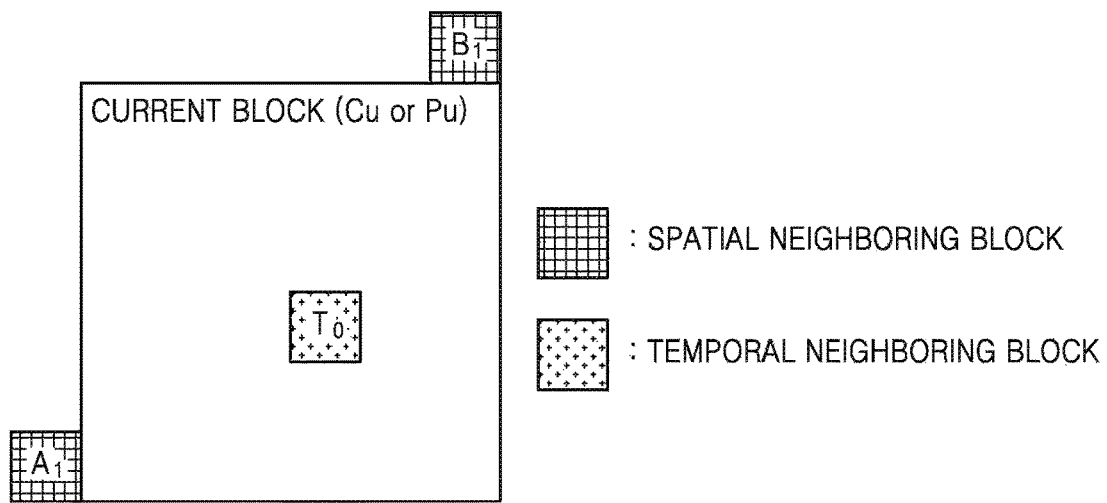
FIG. 4A is a diagram for describing a process of obtaining a disparity vector from neighboring blocks related to a current block, according to an embodiment.

FIG. 4A is a diagram for describing a process of obtaining a disparity vector from neighboring blocks related to a current block, according to an embodiment.

Referring to FIG. 4A, the controller 21 of the image decoding apparatus 20 may obtain a disparity vector of a current block from neighboring blocks spatially and temporally related to the current block. The current block may be a coding unit (CU) or a prediction unit (PU). The disparity vector may be obtained from an A1 block located at a left lower side of the current block and a B1 block located at a right upper side as the spatially related neighboring blocks. In order to obtain the disparity vector, whether the current block has a disparity vector in the order of the A1 block and the B1 block may be checked, and when the current block has the disparity vector between the A1 block and the B1 block, the disparity vector of the current block may be obtained by using the corresponding disparity vector.

Also, the disparity vector of the current block may be obtained by using a temporal neighboring block (TO) located at the same position as the current block among the blocks of the reference picture. Two reference pictures may be used as a reference picture temporally related to a current picture. A first reference picture of the two reference pictures may be determined as a reference picture that is signaled through reference picture information of a slice header. When a random access point (RAP) picture is included among the reference pictures included in the reference picture list, a second reference picture may be determined as an RAP picture. If the RAP picture does not exist in the reference picture list, a reference picture having the lowest temporal identifier (ID) among the reference pictures of the reference picture list may be determined as the second reference picture. When the reference picture having the lowest temporal ID is plural, a reference picture having the smallest picture order count (POC) with respect to the current picture may be determined as the second reference picture. A motion vector of a block of the same position of the second reference picture may be optionally used to determine the disparity vector of the current block.

On the other hand, the disparity vector may be obtained from neighboring blocks using motion compensation prediction (MCP) as well as the neighboring block having the disparity vector using disparity compensation prediction (DCP) among neighboring blocks temporally and spatially related to the current block, as illustrated in FIG. 4A.

Figure 4B:
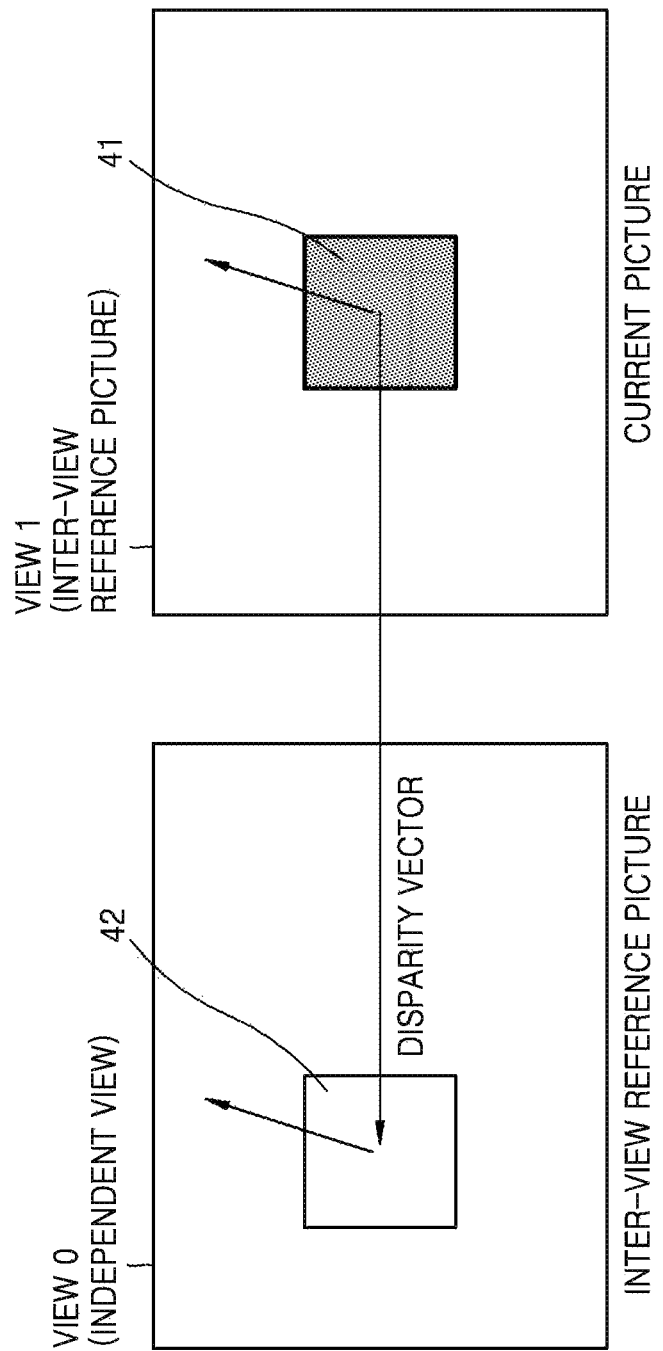
FIG. 4B illustrates a process of obtaining a disparity vector from neighboring blocks, on which motion compensation prediction has been performed, according to an embodiment.

FIG. 4B illustrates a process of obtaining a disparity vector from neighboring blocks, on which motion compensation prediction has been performed, according to an embodiment.

Referring to FIG. 4B, when a neighboring block 41 related to a current block is a block predicted through motion compensation prediction and a motion vector of the neighboring block 41 is predicted through inter-view motion prediction indicating a reference block 42 of another view, a disparity vector used for the inter-view motion prediction of the neighboring block 41 indicates a motion correspondence relation between the current picture and the inter-view reference picture. Therefore, the disparity vector of the current block may be determined by using the motion vector predicted through the inter-view motion prediction of the neighboring block 41.

Figure 4C:
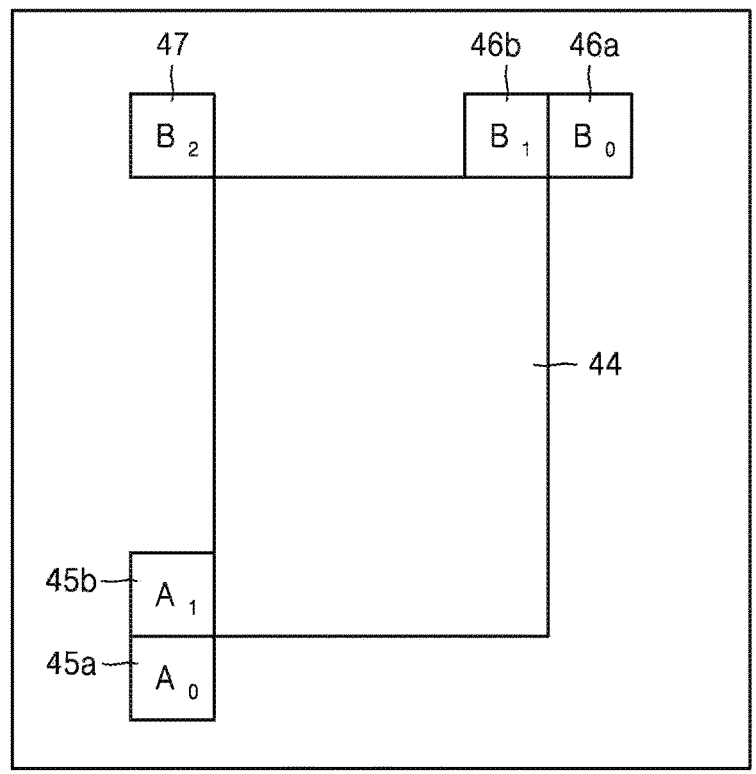
FIG. 4C illustrates a spatial candidate included in a merge candidate list, according to an embodiment.

FIG. 4C illustrates a spatial candidate included in a merge candidate list, according to an embodiment.

Referring to FIG. 4C, candidate blocks to be referred to by the image decoding apparatus 20 in order to determine prediction information of a current block 44 may be a prediction unit spatially adjacent to the current block 44. In this case, the current block may be a prediction unit. For example, a prediction unit A0 45a located outside a left lower end of a left lower sample of the current block 44, a prediction unit A1 45b located outside a left side of the left lower sample of the current block 44, a prediction unit B0 46a located outside a right upper end of a right upper sample of the current block 44, a prediction unit B1 46b located outside an upper end of the right upper sample of the current block 44, and a prediction unit B2 47 located outside a left upper end of a left upper sample of the current block 44 may become candidate blocks. In order to determine the blocks that may become the candidate blocks, prediction units 3200, 3300, 3400, 3500, and 3600 located certain positions may be searched for in the order of the prediction unit A1 45b, the prediction unit B1 46b, the prediction unit B0 46a, the prediction unit A0 45a, and the prediction unit B2 47.

For example, four prediction units among the prediction unit A1 45b, the prediction unit B1 46b, the prediction unit B0 46a, the prediction unit A0 45a, and the prediction unit B2 47 may be selected as spatial candidate blocks. That is, the four spatial candidate blocks may be included in a candidate list for inter prediction.

The image decoding apparatus 20 may add only blocks having motion information among the prediction unit A1 45b, the prediction unit B1 46b, the prediction unit B0 46a, the prediction unit A0 45a, and the prediction unit B2 47, that is, only the inter-predicted blocks, to the prediction candidates, and may exclude blocks having no motion information from the prediction candidates. Also, the image decoding apparatus 20 may exclude blocks having redundant motion information from the prediction candidates for inter prediction.

The positions and the number of neighboring blocks that may be included in the spatial prediction candidates are not limited to the above example and may be changed.

FIG. 4C illustrates a temporal candidate included in a merge candidate list, according to an embodiment.

Figure 4D:
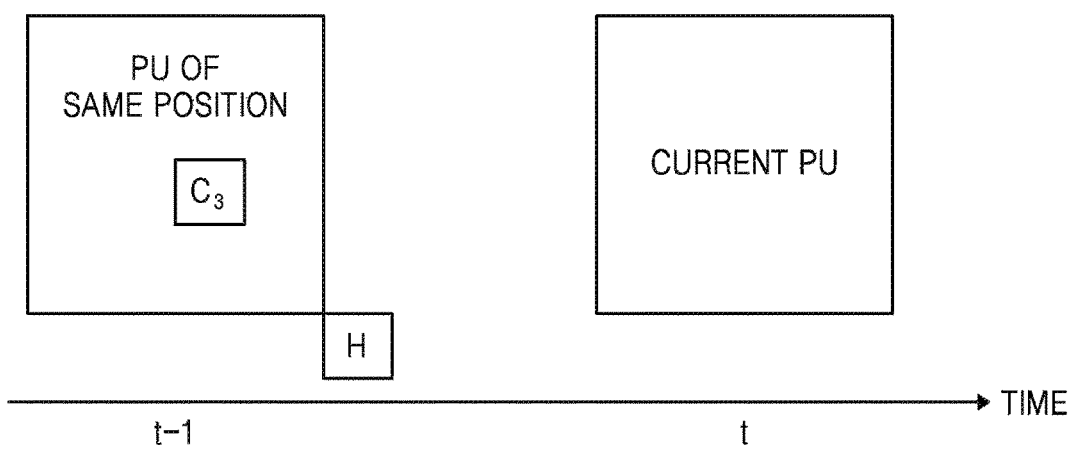
FIG. 4D illustrates a temporal candidate included in a merge candidate list, according to an embodiment.

A direction of a reference picture for a temporal merging candidate and a reference picture index may be transmitted to a decoder (decoding apparatus) through a slice header. FIG. 4D illustrates a selection position of a temporal merging candidate of a current prediction unit (PU). A prediction unit of the same position means a prediction unit (PU) existing at the same position as a current prediction unit in a selected reference picture. The temporal merging candidate first searches for a right end block H of a prediction unit (PU) of the same position and, when motion information of the right end block H does not exist, searches for a block including a pixel of a center C3 of the prediction unit (PU) of the same position.

Figure 4E:
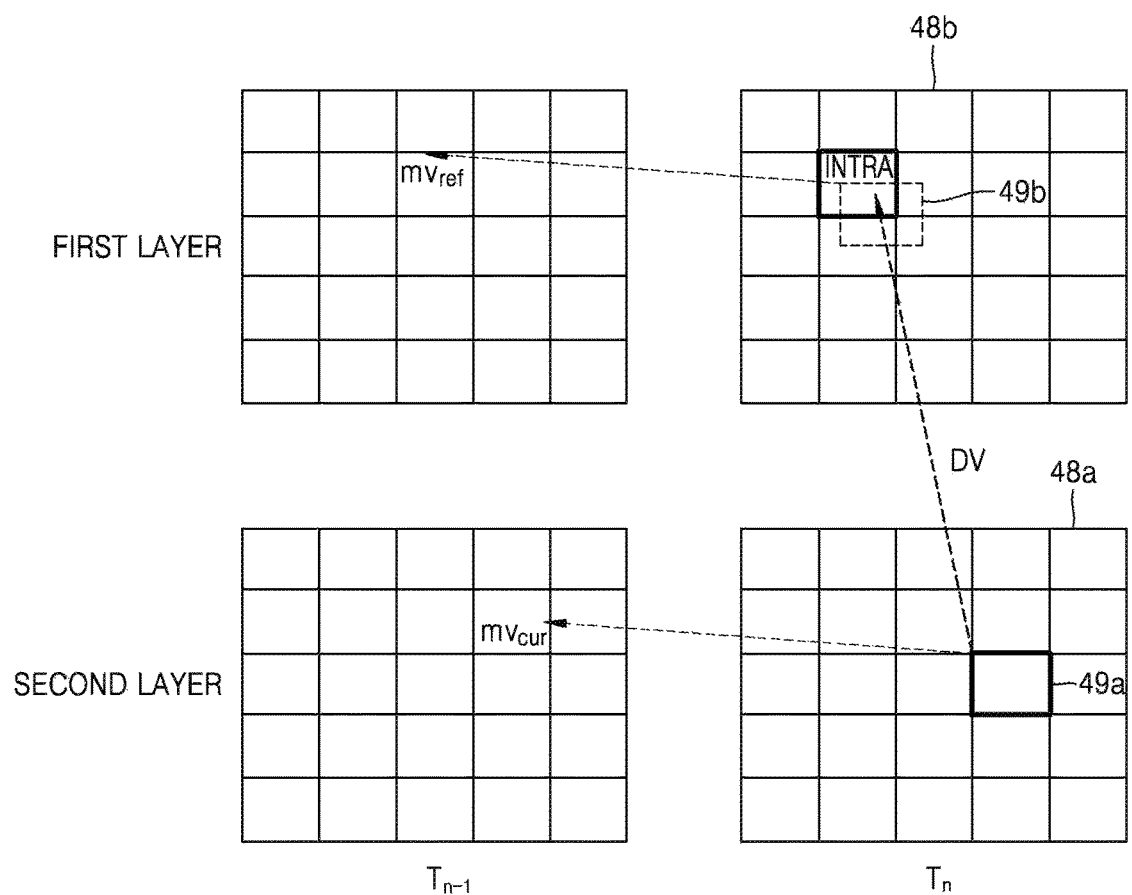
FIG. 4E illustrates an inter-view candidate used in a merge mode, according to an embodiment.

FIG. 4E illustrates an inter-view prediction candidate used in a merge mode, according to an embodiment.

Referring to FIG. 4E, the controller 21 of the image decoding apparatus 20 determines whether a first layer reference block 49b indicated by a disparity vector DV at a position of a current block 49a has motion information mvref, in order for inter prediction of the current block 49a included in a second layer current picture 48a. That is, the controller 21 of the image decoding apparatus 20 determines whether the first layer reference block 49b included in the reference picture 48b is determined as an inter mode or a skip mode. A reference position indicated by the disparity vector may be based on a central pixel of the current block 49a or may be based on a left end pixel of the current block 49a.

When the first layer reference block 49b has the motion information, the controller 21 of the image decoding apparatus 20 may determine the reference block 49b as an inter-view prediction candidate and add the motion information of the reference block 49b to the candidate list for inter prediction. On the other hand, the block used to determine the inter-view prediction candidate may be a coding unit or a prediction unit.

Figure 5:
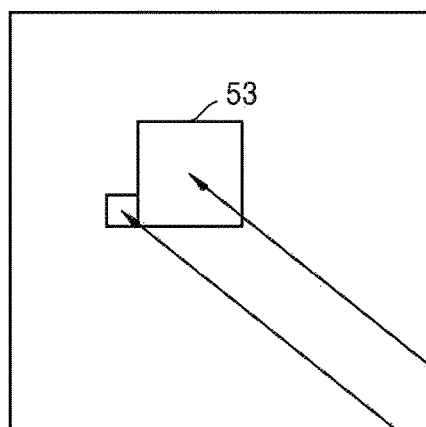
FIG. 5 is a diagram for describing an image decoding method using a view synthesis prediction candidate, according to an embodiment.
Figure 5:
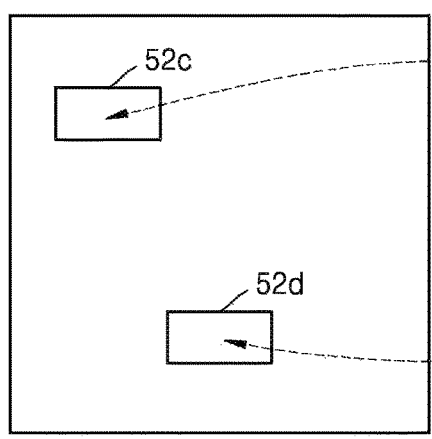
Figure 5:
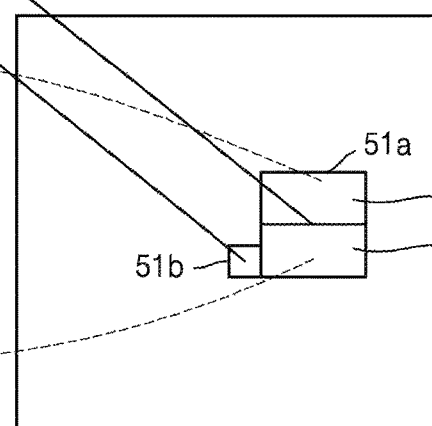

FIG. 5 is a diagram for describing an image decoding method using view synthesis prediction, according to an embodiment.

According to an embodiment, since the image decoding apparatus 20 does not have information about the disparity vector of the current block, the image decoding apparatus 20 derives a disparity vector of a neighboring block of the current block. The current block may be defined as including a prediction unit. For example, a neighboring block 51b of a current block 51a corresponds to a block reconstructed earlier than the current block 51a and may be in a state in which information of a disparity vector 52b related to the neighboring block 51b is restored. That is, the controller 21 may obtain information about the disparity vector 52b of the neighboring block 51b so as to derive the disparity vector 52a related to the current block 51a. Since it has been described that the disparity vector related to the current block can be derived by using various derivation methods including those of FIGS. 4A through 4D, detailed descriptions thereof will be omitted.

According to an embodiment, the controller 21 of the image decoding apparatus 20 may determine the disparity vector 52a of the current block 51a by using information about the disparity vector 52b of the neighboring block 51b of the current block 51a. Since it has been described that the disparity vector related to the current block can be derived by using various derivation methods including those of FIGS. 4A through 4D, detailed descriptions thereof will be omitted.

According to an embodiment, the controller 21 of the image decoding apparatus 20 may determine a reference block related to the current block 51a on a reference texture picture by using information about a depth block 53 on a reference depth picture of a reference layer (or a reference view) that may be determined according to the disparity vector 52a of the current block 51a. The reference block may be defined as blocks on a reference picture related to at least one sub-blocks included in the current block 51a. Furthermore, the sub-blocks are blocks divided from the current block 51a, and each of the sub-blocks may include at least one sample. Hereinafter, for convenience of description, it is assumed that the sub-block is a block of a specific size including a plurality of samples.

Referring to FIG. 5, the controller 21 of the image decoding apparatus 20 may determine the depth block 53 on the reference depth picture indicated by the disparity vector 52a of the current block 51a, and may determine the disparity vector indicating the block on the reference texture picture from sub-blocks 51c and 51d of the current block 51a, based on a depth value related to the depth block 53. That is, the controller 21 may obtain information about the disparity vector 52a of the current block 51a from the neighboring block 51b as a representative disparity vector, and may determine the disparity vector of each of the sub-blocks 51c and 51d based on the depth value of the depth block 53 on the reference depth picture that may be determined based on the obtained disparity vector 52a.

According to an embodiment, the reference depth picture and the reference texture picture may be pictures included in the same view (or layer). There are various methods of determining the disparity vector of each of the sub-blocks 51a and 51b based on the depth value of the depth block 53. For example, the disparity vector of each of the sub-blocks 51a and 51b may be determined based on a geometric relationship between a current view (or layer) related to the current block 51a and a reference view (or layer) related to the reference depth block 53 (for example, a distance between image capturing apparatuses related to two views, a focal length, or the like). Since such a determining process may be performed based on various methods that can be carried out by those of ordinary skill in the art, detailed descriptions thereof will be omitted.

According to an embodiment, each sub-block may be determined based on information about sub-block partitioning of the current block, so as to determine a size of the sub-block. For example, when the information about the sub-block partitioning indicates 1, the sub-block may be determined as including one sample, and when the information about the sub-block partitioning indicates 2, the sub-block may be determined as a block of a specific size including a plurality of samples.

According to an embodiment, the controller 21 of the image decoding apparatus 20 may determine reference blocks 52c and 52d on the reference texture picture based on the disparity vector of each of the sub-blocks 51c and 51d included in the current block 51a. That is, the controller 21 may determine the reference block included in the reference texture picture by performing backward warping by using the disparity vector of each of the sub-blocks 51c and 51d. The image decoding apparatus 20 may generate a prediction value of the current block by using the reference block and perform prediction decoding by using the prediction value. That is, the controller 21 of the image decoding apparatus 20 may perform prediction related to the current block 51a by synthesizing reference blocks (for example, 52c and 52d) determined at each sub-block (for example, 51c and 51d).

According to an embodiment, the controller 21 of the image decoding apparatus 20 may generate a merge candidate list related to a determined prediction unit. The controller 21 may determine a prediction mode as a method of predicting an image. The prediction mode relates to a method of predicting samples included in a coding unit, and such a prediction mode may include various prediction methods. For example, inter prediction or inter-layer prediction that performs prediction with reference to pictures on different screens may be used.

The image decoding apparatus 20 according to an embodiment may receive bitstreams with respect to each layer according to a scalable coding method. The number of layers of the bitstreams received by the image decoding apparatus 20 is not limited. However, for convenience of description, an embodiment in which the image decoding apparatus 20 receives and decodes a first layer stream and receives and decodes a second layer stream will be described below.

The image decoding apparatus 20 may obtain encoded data of first layer images and second layer images from the first layer stream and the second layer stream and further obtain a motion vector generated by inter prediction and prediction information generated by inter-layer prediction.

For example, the image decoding apparatus 20 may decode data inter-predicted with respect to each layer and decode data inter-layer-predicted between a plurality of layers. Reconstruction may be performed through motion compensation and inter-layer decoding based on the coding unit or the prediction unit.

Images may be reconstructed by performing motion compensation for the current image with reference to reconstructed images predicted through inter prediction of the same layer with respect to each layer stream. The motion compensation means an operation of reconfiguring a reconstructed image of a current image by combining a reference image determined by using a motion vector of the current image with a residual component of the current image.

Also, the image decoding apparatus 20 may perform inter-layer decoding with reference to prediction information of the first layer images so as to decode the second layer image predicted through the inter-layer prediction. The inter-layer decoding include an operation of reconfiguring prediction information of the current image by using prediction information of a reference block of another layer so as to determine the prediction information of the current image.

The image decoding apparatus 20 decodes each of blocks of each of images of a video. The block may be a largest coding unit, a coding unit, a prediction unit, a transformation unit, or the like from among coding units of a tree structure.

The image decoding apparatus 20 may decode the first layer image by using encoding symbols of a parsed first layer image. If the image decoding apparatus 20 receives streams that are encoded based on the coding units of the tree structure, the image decoding apparatus 20 may perform decoding on each largest coding unit of the first layer stream, based on the coding units of the tree structure.

The image decoding apparatus 20 may perform entropy decoding on each largest coding unit, and thus may obtain decoding information and the decoded data. The image decoding apparatus 20 may perform inverse-quantization and inverse-transformation on the encoded data obtained from the stream, and thus may reconstruct a residual component. The image decoding apparatus 20 according to another embodiment may directly receive a bitstream of quantized transform coefficients. As a result of the inverse-quantization and the inverse-transformation that are performed on the quantized transform coefficients, a residual component of images may be reconstructed.

The image decoding apparatus 20 may reconstruct the first layer images by combining the prediction image and the residual component through motion compensation on same layer images.

The image decoding apparatus 20 may generate a second layer prediction image by using samples of a reconstructed first layer image according to the inter-layer prediction structure. The image decoding apparatus 20 may decode the second layer stream and thus may obtain a prediction error according to inter-layer prediction. The image decoding apparatus 20 may combine the second layer prediction image and the prediction error, thereby generating a reconstructed second layer image.

The image decoding apparatus 20 may determine the second layer prediction image by using the decoded reconstructed first layer image. The image decoding apparatus 20 may perform inter prediction with respect to each block, such as a coding unit or a prediction unit of the second layer image, according to the inter-layer prediction structure. That is, the image decoding apparatus 20 may determine a block of the first layer image to be referred to by a block of the second layer image. For example, a reconstruction block of the first layer image positioned in the second layer image in correspondence to a position of a current block may be determined. The image decoding apparatus 20 may determine a second layer prediction block by using a first layer reconstruction block corresponding to a second layer block.

On the other hand, in order to reduce an amount of data related to motion information transmitted based on prediction units, the image decoding apparatus 20 may use a merge mode of setting motion information existing in a neighboring block of the current block or a reference block of the current block in an inter-layer direction, as motion information of the current block, based on spatial/temporal correlation.

The merge candidate list may include a spatial candidate based on motion information of a spatial neighboring block, a temporal candidate based on motion information of a temporal neighboring block, and an inter-layer candidate.

The inter-layer candidate may include a temporal inter-layer candidate based on motion information existing in the reference block in the inter-layer direction, and a disparity inter-layer candidate based on disparity vector information indicating the reference block in the inter-layer direction. Therefore, the motion parameter inheritance candidate, the inter-view candidate, the disparity candidate, and the view synthesis prediction candidate may correspond to the temporal inter-layer candidate or the disparity inter-layer candidate according to the use or non-use of the motion information or the disparity vector information.

The image decoding apparatus 20 may add at least one of the spatial candidate, the temporal candidate, the temporal inter-layer candidate, and the disparity inter-layer candidate to the merge candidate list according to a predetermined order. The image decoding apparatus 20 according to an embodiment may generate the merge candidate list, from which some merging candidates are excluded, based on the prediction method of the current block, thereby improving decoding efficiency.

FIG. 6A illustrates a process of generating a merge candidate list, according to an embodiment.

The controller 21 of the image decoding apparatus 20 may determine availability of each merging candidate so as to generate the merge candidate list. When the controller 21 determines that the merging candidate is available, the controller 21 may add the corresponding merging candidate to the merge candidate list for the current prediction unit.

Referring to FIG. 6A, the controller 21 according to an embodiment may determine the availability of the spatial merging candidate (61a). Specifically, the controller 21 may determine the availability of each of the spatial merging candidates. For example, when a value of availableFlagA1 indicating availability of a spatial merging candidate adjacent to a left side of a current prediction unit is not 0, the controller 21 may determine that the spatial merging candidate adjacent to the left side is available. Since the spatial merging candidate has been described with reference to FIG. 4C, detailed descriptions thereof will be omitted. When the controller 21 determines that the spatial merging candidate in the current prediction unit is available, the controller 21 may perform operation 61b of adding the corresponding spatial prediction candidate to the merge candidate list. Referring to FIG. 6A, when availableFlagA1 is not 0, the controller 21 may add a spatial merging candidate A1 to extMergeCandList indicating the merge candidate list.

According to an embodiment, the controller 21 of the image decoding apparatus 20 may determine availability of a view synthesis prediction merging candidate. Specifically, when a value of availableFlagVSP indicating the availability of the view synthesis prediction merging candidate is not 0, the controller 21 may determine that the view synthesis prediction merging candidate in the current prediction unit is available. When the controller 21 determines that the view synthesis prediction merging candidate in the current prediction unit is available, the controller 21 may perform operation 62d of adding the view synthesis prediction merging candidate to the merge candidate list. Referring to FIG. 6A, when availableFlagVSP is not 0, the controller 21 may add VSP indicating the view synthesis prediction merging candidate to extMergeCandList indicating the merge candidate list. The controller 21 may determine a prediction mode based on the merge candidate list including the view synthesis prediction merging candidate. Specifically, the image decoding apparatus 20 may obtain a bitstream including an index or information about the prediction mode used in the process of encoding the current prediction unit, and determine the prediction mode of the current prediction unit based on the merge candidate list related to the current prediction unit and the corresponding information or index.

According to an embodiment, the controller 21 of the image decoding apparatus 20 may determine whether the view synthesis prediction merging candidate is available and whether the block corresponding to the spatial merging candidate A1 adjacent to the left side of the current prediction unit is a block reconstructed by performing view synthesis prediction. Specifically, the controller 21 may determine whether a value of availableFlagVSP indicating the availability of the view synthesis prediction merging candidate is not 0 (62a). Furthermore, the controller 21 may determine the availability of the spatial merging candidate adjacent to the left side of the current prediction unit (62b), and may determine whether the spatial merging candidate adjacent to the left side of the current prediction unit has been reconstructed by view synthesis prediction (62c).

Referring to FIG. 6A, the controller 21 may determine whether availableFlagA1 indicating the availability of the spatial merging candidate adjacent to the left side of the current prediction unit is 0 (62b), and may determine whether a value of VspMcFlag[xPb−1][yPb+nPbH−1] indicating whether the spatial merging candidate adjacent to the left side of the current prediction unit has been reconstructed by view synthesis prediction is 0 (62c). xPb and yPb may be defined by indicating positions on the picture of the current prediction unit, and nPbH may be defined as indicating a height of the current prediction unit. When VspMcFlag[xPb−1][yPb+nPbH−1] is 0, the controller 21 may determine that the spatial merging candidate adjacent to the left side of the current prediction unit has not been reconstructed according to view synthesis prediction, and when VspMcFlag[xPb−1][yPb+nPbH−1] is not 0, the controller 21 may determine that the spatial merging candidate adjacent to the left side of the current prediction unit has been reconstructed according to view synthesis prediction.

According to an embodiment, in a case where the spatial merging candidate adjacent to the left side of the current prediction unit is available; the corresponding spatial merging candidate has not been reconstructed according to view synthesis prediction; and availableFlagVSP indicating the availability of the view synthesis prediction merging candidate in the current prediction unit is not 0, the controller 21 may add VSP indicating the view synthesis prediction merging candidate to the merge candidate list.

According to an embodiment, even when the spatial merging candidate adjacent to the left side of the current prediction unit is available but the corresponding spatial merging candidate has not been reconstructed according to view synthesis prediction, if availableFlagVSP indicating the availability of the view synthesis prediction merging candidate in the current prediction unit is not 0, the controller 21 may add VSP indicating the view synthesis prediction merging candidate to extMergeCandList indicating the merge candidate list.

According to an embodiment, in a case where the spatial merging candidate adjacent to the left side of the current prediction unit is available and the corresponding spatial merging candidate has been reconstructed according to view synthesis prediction, even when availableFlagVSP indicating the availability of the view synthesis prediction merging candidate in the current prediction unit is not 0, the controller 21 may not add VSP indicating the view synthesis prediction merging candidate to extMergeCandList indicating the merge candidate list. That is, although it is determined that the view synthesis prediction merging candidate is available in the current prediction unit, if the spatial merging candidate existing in the left side of the current prediction unit has been reconstructed according to view synthesis prediction, the view synthesis prediction merging candidate is not added to the merge candidate list related to the current prediction unit.

According to an embodiment, the controller 21 of the image decoding apparatus 20 may perform an operation of adding the view synthesis prediction merging candidate to the merge candidate list in the process of adding some of the spatial merging candidates to the merge candidate list. For example, the controller 21 may perform an operation of adding the view synthesis prediction merging candidate to the merge candidate list after the operation of adding, to the merge candidate list, A1 adjacent to the left side of the current prediction unit and B1 adjacent to the upper end of the current prediction unit among the spatial merging candidates as illustrated in FIG. 6A. Therefore, as the condition for adding the view synthesis prediction merging candidate to the merge candidate list, whether the spatial merging candidate adjacent to the left side of the current prediction unit is available and whether the spatial merging candidate adjacent to the left side of the current prediction unit has been reconstructed according to view synthesis prediction may be determined.

According to an embodiment, in operation S312, the controller 21 of the image decoding apparatus 20 may determine the prediction mode to be performed in the current prediction unit based on the merge candidate list generated in operation S311.

FIG. 6B illustrates an operation of determining a prediction mode of a current prediction unit according to a neighboring block of the current prediction unit has used view synthesis prediction, according to an embodiment.

According to an embodiment, in a case where the spatial merging candidate adjacent to the left side of the current prediction unit is available and the corresponding spatial merging candidate has been reconstructed according to view synthesis prediction, even when availableFlagVSP indicating the availability of the view synthesis prediction merging candidate in the current prediction unit is not 0, the controller 21 may not add VSP indicating the view synthesis prediction merging candidate to extMergeCandList indicating the merge candidate list. Therefore, in this case, the view synthesis prediction merging candidate is not added to the merge candidate list for the current prediction unit. However, according to an embodiment, in a case where the view synthesis prediction merging candidate in the current prediction unit is available; the spatial merging candidate adjacent to the left side of the current prediction unit is available; and the corresponding spatial merging candidate has been reconstructed according to view synthesis prediction, even when the view synthesis prediction merging candidate does not exist in the merge candidate list, the controller 21 may determine the prediction mode of the current prediction unit as the view synthesis prediction.

Referring to FIG. 6B, in a case where N, which is information related to the merging candidate used in the current prediction unit, indicates A1 and thus it is determined that prediction is performed by using A1, which is the spatial merging candidate in the current prediction unit (63b); VspMcFlag[xPb−1][yPb+nPbH−1] indicates 1 and thus it is determined that the spatial merging candidate adjacent to the left side of the current prediction unit has been reconstructed according to view synthesis prediction (63c); and availableFlagVSP indicates 1 and thus it is determined that the view synthesis prediction merging candidate in the prediction unit is available (63a), the controller 21 may determine that the prediction is performed by using the view synthesis prediction merging candidate in the current prediction unit (63d). That is, when it is determined that A1, which is the spatial merging candidate A1 for the current prediction unit, has been reconstructed through view synthesis prediction, the controller 21 may determine to perform view synthesis prediction on the current prediction unit. Whether other spatial merging candidates A0, B0, B1, and B2 have been reconstructed according to view synthesis prediction is not determined, and whether A1 added first to the merge candidate list has been reconstructed according to view synthesis prediction is just checked. As a result, when A1 has been reconstructed according to view synthesis prediction, it is likely that the current prediction unit also has been encoded through view synthesis prediction. Thus, the controller 21 may determine to perform the prediction mode through the view synthesis prediction. Accordingly, the efficiency of the image decoding may be increased through simplification of calculation in the image decoding apparatus 20.

According to an embodiment, a bitstream obtainer (not illustrated) of the image decoding apparatus 20 may obtain a bitstream including information about the prediction mode used in the process of encoding the current prediction unit. The image decoding apparatus 20 may determine a method by which the current prediction unit has been encoded, according to the merging candidate. Thus, the image decoding apparatus 20 may obtain information about the merging candidate related to the prediction of the current prediction unit from the bitstream, determine the merging candidate in the merge candidate list based on the corresponding information, and determine the prediction mode according to the determined merging candidate. The prediction mode performed in the current prediction unit may be determined as one of the merging candidates in the merge candidate list based on rate-distortion costs of merging candidates by the image encoding apparatus 25.

According to an embodiment, in a case where the neighboring prediction unit is unavailable as the spatial merging candidate or the neighboring prediction unit has been encoded without using the view synthesis prediction merging candidate, the controller 21 of the image decoding apparatus 20 may perform an operation of adding the view synthesis prediction merging candidate to the merge candidate list after a first spatial merging candidate adjacent to the left side of the current prediction unit and a second spatial merging candidate adjacent to the upper end of the current prediction unit among the spatial merging candidates are added to the merge candidate list. In a case where the neighboring prediction unit is unavailable as the spatial merging candidate or the neighboring prediction unit has been encoded without using the view synthesis prediction merging candidate, the controller 21 may not generate the merge candidate list including the view synthesis prediction merging candidate instead of the spatial merging candidate related to the neighboring prediction unit, but may additionally add the view synthesis prediction merging candidate to the merge candidate list in the process of adding the spatial merging candidate to the merge candidate list. According to an embodiment, the view synthesis prediction merging candidate may be added after the first spatial merging candidate adjacent to the left side of the current prediction unit and the second spatial merging candidate adjacent to the upper end of the current prediction unit among the spatial merging candidates are added to the merge candidate list.

In operation S313, the controller 21 of the image decoding apparatus 20 may perform prediction according to the prediction mode determined in operation S312. Since the process of reconstructing the image by performing the prediction has been described with reference to various embodiments and will be described in the following image reconstructing process, detailed description thereof will be omitted.

Figure 2B:
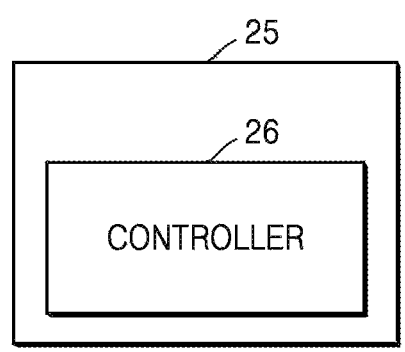
FIG. 2B is a block diagram of an image encoding apparatus according to an embodiment.

FIG. 2B is a block diagram of an image encoding apparatus 25 according to an embodiment. The image encoding apparatus 25 of FIG. 2B may correspond to the multiview video encoding apparatus 12 of FIG. 1A. According to an embodiment, the image encoding apparatus 25 may include a controller 26. The controller 26 may split an image into a plurality of coding units so as to decode the image. In order to determine the coding unit, the controller 26 may first determine a maximum size of the coding unit. The controller 26 may determine the coding unit by splitting the image into largest coding units according to the determined maximum size of the coding unit and then hierarchically splitting each of the largest coding units. According to an embodiment, a bitstream including information about the maximum size of the coding unit may be generated by a bitstream generator (not illustrated), and the controller 26 may determine the maximum size of the coding unit based on the information about the maximum size.

According to an embodiment, the controller 26 of the image encoding apparatus 25 may determine at least one prediction unit in the coding unit. This process may correspond to a process in which the image decoding apparatus 20 determines at least one prediction unit in operation S310 of FIG. 3. A specific method of determining at least one prediction unit in the coding unit will be described below in detail.

The controller 26 performs prediction encoding on a texture image of a multiview and a depth image input thereto. The controller 26 uses prediction so as to reduce redundant information in the multiview image. Specifically, an intra predictor (not illustrated) predicts a current block with reference to reconstructed samples neighboring a current block. An inter predictor (not illustrated) performs inter prediction to generate a prediction value of the current block from previously encoded/decoded pictures. A prediction mode determiner (not illustrated) may determine an optimal prediction mode of the current block by comparing costs of result values encoded according to various intra prediction modes and inter prediction modes, and outputs determined prediction mode information. The operations of the intra predictor (not illustrated), the inter prediction unit (not illustrated), and the prediction mode determiner (not illustrated) may be performed by the controller 26.

In the inter prediction, a process of finding an optimal prediction block from reference pictures is referred to as motion estimation. For more precise motion estimation, after interpolating a reconstructed picture according to a type of a video codec, motion estimation may be performed on the interpolated image in sub-pixel units. Motion compensation means generating a prediction block based on motion information (motion vector, reference picture index) about the optimal prediction block found in the motion estimation process. The controller 26 may find the optimal prediction block from the reference pictures through the motion estimation process and generate the prediction block through the motion compensation process.

The controller 26 generates the prediction block of the current block through intra prediction or inter prediction, and performs transformation, quantization, and entropy encoding on a residual signal, which is a difference value between a prediction block and an original block.

The image encoding apparatus 25 may generate a bitstream including data related to a prediction-encoded multiview video. According to an embodiment, a bitstream generator (not illustrated) of the image encoding apparatus 25 may generate a bitstream including a data packet generated by multiplexing in NAL units as data related to the multiview video.

In order to encode intra-predicted image data, the image encoding apparatus 25 may generate the bitstream including information about the prediction mode of the current block, information for specifying an intra prediction mode applied to the current block among intra prediction modes, and the residual signal that is the difference value between the current block and the prediction block. For example, the bitstream including the information about the intra prediction mode applied to the current block among a total of 35 intra prediction modes, that is, a DC mode, a planar mode, and 33 directional modes with directions, may be generated as information about the current block intra-predicted based on HEVC.

In order to transmit inter-predicted image data, information about the prediction mode of the current block, information about a reference picture list, such as list 0 or list 1, index information (ref idx) indicating a reference picture used for the inter prediction of the current block among reference pictures included in the reference picture list, and information about a motion vector of the current block may be included in the bitstream. Also, the inter-predicted or intra-predicted current block may be prediction unit (PU). Specific encoding/decoding methods will be described below with reference to FIGS. 19 through 31.

An advanced motion vector prediction (AMVP) mode and a merge mode using correlation of motion information of the neighboring block and the current block may be used so as to reduce an amount of motion information transmitted during the inter prediction. Both of the merge mode and the AMVP mode are special cases of the inter prediction. In the merge mode and the AMVP mode, previous blocks temporally or spatially related to the current block are used as already reconstructed blocks. A list of previous blocks for deriving motion information may be generated, and the image encoding apparatus 25 may obtain selection information of the previous block in the list. In the merge mode and the AMVP mode, the image encoding apparatus 25 obtains a candidate list of previous blocks so as to retrieve motion information in the same process. In a skip mode, only selection block of a previous block in a merge candidate list may be transmitted without transmitting a residual signal. That is, in the skip mode, only index (merge index) information retrieving motion information in the merge candidate list is included in the bitstream and transmitted, and in the merge mode, the residual signal as well as the index information is included in the bitstream and transmitted.

As described above, the multiview image includes texture images and depth images input at a plurality of views. It is assumed that each of texture images and depth images input through one view constitutes one layer image. For example, in the case of a 3D video, each of a left-view texture image, a right-view texture image, a left-view depth image, and a right-view depth image constitutes one layer image. Also, in a 3D video, only one depth image may be used as a depth image, and a left-view depth image and a right-view depth image may be generated from camera parameter information according to a view difference between a left view and a right view. In such a case, each of the left-view texture image, the right-view texture image, and one depth image constitutes one layer image. Thus, the 3D video may include a total of three layer images. Since the prediction of the multiview image performed through various types of reference processes has been described in relation to the prediction mode described in connection with the image decoding apparatus 20 and the image encoding apparatus 25 also may perform prediction by using a method corresponding to the operation of the image decoding apparatus 20, detailed description thereof will be omitted.

According to an embodiment, the controller 26 of the image encoding apparatus 25 may generate a merge candidate list related to a current prediction unit included in at least one prediction unit. This process may correspond to the merge candidate list generating process performed in operation S311 of FIG. 3 by the image decoding apparatus 20. The controller 26 may use at least one candidate as a merging candidate used in the merge mode. Since the merging candidates that are available by the image encoding apparatus 25 corresponds to those described in connection with the image decoding apparatus 20, detailed descriptions thereof will be omitted.

A process of obtaining a disparity vector related to a current block will be described with reference to FIGS. 4A through 4D. However, since the process of obtaining the disparity vector, which will be described below, is merely an embodiment, various methods for obtaining the disparity vector related to the current block may be used for realizing the present invention.

FIG. 4A is a diagram for describing a process of obtaining a disparity vector from neighboring blocks related to a current block, according to an embodiment.

Referring to FIG. 4A, the controller 26 of the image encoding apparatus 25 may obtain a disparity vector of a current block from neighboring blocks spatially and temporally related to the current block. The current block may be a coding unit (CU) or a prediction unit (PU). The disparity vector may be obtained from an A1 block located at a left lower side of the current block and a B1 block located at a right upper side as the spatially related neighboring blocks. In order to obtain the disparity vector, whether the current block has a disparity vector in the order of the A1 block and the B1 block may be checked, and when the current block has the disparity vector between the A1 block and the B1 block, the disparity vector of the current block may be obtained by using the corresponding disparity vector. Since the process of obtaining the disparity vector of the current block corresponds to the process described in connection with the image decoding apparatus 20, detailed descriptions thereof will be omitted.

FIG. 4B illustrates a process of obtaining a disparity vector from neighboring blocks, on which motion compensation prediction has been performed, according to an embodiment.

Referring to FIG. 4B, when a neighboring block 41 related to a current block is a block predicted through motion compensation prediction and a motion vector of the neighboring block 41 is predicted through inter-view motion prediction indicating a reference block 42 of another view, a disparity vector used for the inter-view motion prediction of the neighboring block 41 indicates a motion correspondence relation between the current picture and the inter-view reference picture. Therefore, the disparity vector of the current block may be determined by using the motion vector predicted through the inter-view motion prediction of the neighboring block 41.

FIG. 4C illustrates a spatial candidate included in a merge candidate list, according to an embodiment.

Referring to FIG. 4C, candidate blocks to be referred to by the image encoding apparatus 25 in order to determine prediction information of a current block 44 may be a prediction unit spatially adjacent to the current block 44. In this case, the current block may be a prediction unit. For example, a prediction unit A0 45*a* located outside a left lower end of a left lower sample of the current block 44, a prediction unit A1 45*b* located outside a left side of the left lower sample of the current block 44, a prediction unit B0 46*a* located outside a right upper end of a right upper sample of the current block 44, a prediction unit B1 46*b* located outside an upper end of the right upper sample of the current block 44, and a prediction unit B2 47 located outside a left upper end of a left upper sample of the current block 44, In order to determine the blocks that may become the candidate blocks, prediction units 3200, 3300, 3400, 3500, and 3600 located certain positions may be searched for in the order of the prediction unit A1 45*b*, the prediction unit B1 46*b*, the prediction unit B0 46*a*, the prediction unit A0 45*a*, and the prediction unit B2 47.

For example, four prediction units among the prediction unit A1 45*b*, the prediction unit B1 46*b*, the prediction unit B0 46*a*, the prediction unit A0 45*a*, and the prediction unit B2 47 may be selected as spatial candidate blocks. That is, the four spatial candidate blocks may be included in a candidate list for inter prediction.

The image encoding apparatus 25 may add only blocks having motion information among the prediction unit A1 45*b*, the prediction unit B1 46*b*, the prediction unit B0 46*a*, the prediction unit A0 45*a*, and the prediction unit B2 47, that is, only the inter-predicted blocks, to the prediction candidates, and may exclude blocks having no motion information from the prediction candidates. Also, the image encoding apparatus 25 may exclude blocks having redundant motion information from the prediction candidates for inter prediction.

The positions and the number of neighboring blocks that may be included in the spatial prediction candidates are not limited to the above example and may be changed.

FIG. 4C illustrates a temporal candidate included in a merge candidate list, according to an embodiment.

A direction of a reference picture for a temporal merging candidate and a reference picture index may be transmitted to a decoder (decoding apparatus) through a slice header. FIG. 4D illustrates a selection position of a temporal merging candidate of a current prediction unit (PU). A prediction unit of the same position means a prediction unit (PU) existing at the same position as a current prediction unit in a selected reference picture. The temporal merging candidate first searches for a right end block H of a prediction unit (PU) of the same position and, when motion information of the right end block H does not exist, searches for a block including a pixel of a center C3 of the prediction unit (PU) of the same position.

FIG. 4E illustrates an inter-view candidate used in a merge mode, according to an embodiment.

Referring to FIG. 4E, the controller 26 of the image encoding apparatus 25 determines whether a first layer reference block 49*b* indicated by a disparity vector DV at a position of a current block 49*a* has motion information mvref, in order for inter prediction of the current block 49*a* included in a second layer current picture 48*a*. That is, it is determined whether the first layer reference block 49*b* included in the reference picture 48*b* is determined as an inter mode or a skip mode. A reference position indicated by the disparity vector may be based on a central pixel of the current block 49*a* or may be based on a left end pixel of the current block 49*a*.

When the first layer reference block 49*b* has the motion information, the controller 26 of the image encoding apparatus 25 may determine the reference block 49*b* as an inter-view merging candidate and add the motion information of the reference block 53 to the merge candidate list for inter prediction. On the other hand, the block used to determine the inter-view candidate may be a coding unit or a prediction unit.

FIG. 5 is a diagram for describing an image encoding method using view synthesis prediction, according to another embodiment.

According to an embodiment, since the image encoding apparatus 25 does not have information about the disparity vector of the current block, the image encoding apparatus 25 derives a disparity vector of a neighboring block of the current block. The current block may be defined as including a prediction unit. For example, a neighboring block 51*b* of a current block 51*a* corresponds to a block reconstructed earlier than the current block 51*a* and may be in a state in which information of a disparity vector 52*b* related to the neighboring block 51*b* is restored. That is, the controller 26 may obtain information about the disparity vector 52*b* of the neighboring block 51*b* so as to derive the disparity vector 52*a* related to the current block 51*a*. Since detailed descriptions thereof have been provided in connection with the operation of the image decoding apparatus 20 and those of ordinary skill in the art can easily carry out the prediction operation for encoding in the image encoding apparatus 25 through the corresponding operation, detailed descriptions thereof will be omitted.

FIG. 6A illustrates a process of generating a merge candidate list, according to an embodiment. The controller 26 of the image encoding apparatus 25 may determine availability of each merging candidate so as to generate the merge candidate list. When the controller 26 determines that the merging candidate is available, the controller 21 may add the corresponding merging candidate to the merge candidate list for the current prediction unit.

Referring to FIG. 6A, the controller 26 according to an embodiment may determine the availability of the spatial merging candidate (61*a*). Specifically, the controller 26 may determine the availability of each of the spatial merging candidates. For example, when a value of availableFlagA1 indicating availability of a spatial merging candidate adjacent to a left side of a current prediction unit is not 0, the controller 26 may determine that the spatial merging candidate adjacent to the left side is available. Since the spatial merging candidate has been described with reference to FIG. 4C, detailed descriptions thereof will be omitted. When the controller 26 determines that the spatial merging candidate in the current prediction unit is available, the controller 21 may perform operation 61b of adding the corresponding spatial prediction candidate to the merge candidate list. Referring to FIG. 6A, when availableFlagA1 is not 0, the controller 26 may add a spatial merging candidate A1 to extMergeCandList indicating the merge candidate list.

According to an embodiment, the controller 26 of the image encoding apparatus 25 may determine availability of a view synthesis prediction merging candidate. Specifically, when a value of availableFlagVSP indicating the availability of the view synthesis prediction merging candidate is not 0, the controller 26 may determine that the view synthesis prediction merging candidate in the current prediction unit is available. When the controller 26 determines that the view synthesis prediction merging candidate in the current prediction unit is available, the controller 21 may perform operation 62d of adding the view synthesis prediction merging candidate to the merge candidate list. Referring to FIG. 6A, when availableFlagVSP is not 0, the controller 26 may add VSP indicating the view synthesis prediction merging candidate to extMergeCandList indicating the merge candidate list.

According to an embodiment, the controller 26 of the image encoding apparatus 25 may determine whether the view synthesis prediction merging candidate is available and whether the block corresponding to the spatial merging candidate A1 adjacent to the left side of the current prediction unit is a block reconstructed by performing view synthesis prediction. Specifically, the controller 26 may determine whether a value of availableFlagVSP indicating the availability of the view synthesis prediction merging candidate is not 0 (62a). Furthermore, the controller 26 may determine the availability of the spatial merging candidate adjacent to the left side of the current prediction unit (62b), and may determine whether the spatial merging candidate adjacent to the left side of the current prediction unit has been reconstructed by view synthesis prediction (62c).

Referring to FIG. 6A, the controller 26 may determine whether availableFlagA1 indicating the availability of the spatial merging candidate adjacent to the left side of the current prediction unit is 0 (62b), and may determine whether a value of VspMcFlag[xPb−1][yPb+nPbH−1] indicating whether the spatial merging candidate adjacent to the left side of the current prediction unit has been reconstructed by view synthesis prediction is 0 (62c). xPb and yPb may be defined by indicating positions on the picture of the current prediction unit, and nPbH may be defined as indicating a height of the current prediction unit. When VspMcFlag[xPb−1][yPb+nPbH−1] is 0, the controller 26 may determine that the spatial merging candidate adjacent to the left side of the current prediction unit has not been reconstructed according to view synthesis prediction, and when VspMcFlag[xPb−1][yPb+nPbH−1] is not 0, the controller 26 may determine that the spatial merging candidate adjacent to the left side of the current prediction unit has been reconstructed according to view synthesis prediction.

According to an embodiment, when the spatial merging candidate adjacent to the left side of the current prediction unit is available; the spatial merging candidate has not been reconstructed according to view synthesis prediction; and availableFlagVSP indicating the availability of the view synthesis prediction merging candidate in the current prediction unit is not 0, the controller 26 may add VSP indicating the view synthesis prediction merging candidate to the merge candidate list. The controller 26 may determine a prediction mode based on the merge candidate list including the view synthesis prediction merging candidate. According to an embodiment, the image encoding apparatus 25 may generate a bitstream including an index or information about the prediction mode used in the process of encoding the current prediction unit, and transmit the bitstream to the image decoding apparatus 20.

According to an embodiment, although the spatial merging candidate adjacent to the left side of the current prediction unit is available but the spatial merging candidate has not been reconstructed according to view synthesis prediction, if availableFlagVSP indicating the availability of the view synthesis prediction merging candidate in the current prediction unit is not 0, the controller 26 may add VSP indicating the view synthesis prediction merging candidate to extMergeCandList indicating the merge candidate list.

According to an embodiment, in a case where the spatial merging candidate adjacent to the left side of the current prediction unit is available and the spatial merging candidate has been reconstructed according to view synthesis prediction, even when availableFlagVSP indicating the availability of the view synthesis prediction merging candidate in the current prediction unit is not 0, the controller 26 may not add VSP indicating the view synthesis prediction merging candidate to extMergeCandList indicating the merge candidate list. That is, although it is determined that the view synthesis prediction merging candidate is available in the current prediction unit, if the spatial merging candidate existing in the left side of the current prediction unit has been reconstructed according to view synthesis prediction, the view synthesis prediction merging candidate is not added to the merge candidate list related to the current prediction unit.

According to an embodiment, the controller 26 of the image encoding apparatus 25 may perform an operation of adding the view synthesis prediction merging candidate to the merge candidate list in the process of adding some of the spatial merging candidates to the merge candidate list. For example, the controller 26 may perform an operation of adding the view synthesis prediction merging candidate to the merge candidate list after the operation of adding, to the merge candidate list, A1 adjacent to the left side of the current prediction unit and B1 adjacent to the upper end of the current prediction unit among the spatial merging candidates as illustrated in FIG. 6A. Therefore, as the condition for adding the view synthesis prediction merging candidate to the merge candidate list, whether the spatial merging candidate adjacent to the left side of the current prediction unit is available and whether the spatial merging candidate adjacent to the left side of the current prediction unit has been reconstructed according to view synthesis prediction may be determined.

According to an embodiment, the controller 26 of the image encoding apparatus 25 may determine the prediction mode to be performed in the current prediction unit based on the generated merge candidate list This process may correspond to the prediction mode determining process performed in operation S312 by the image decoding apparatus 20.

FIG. 6B illustrates operation of determining a prediction mode of a current prediction unit according to a neighboring block of the current prediction unit has used view synthesis prediction, according to an embodiment.

According to an embodiment, in a case where the spatial merging candidate adjacent to the left side of the current prediction unit is available and the corresponding spatial merging candidate has been reconstructed according to view synthesis prediction, even when availableFlagVSP indicating the availability of the view synthesis prediction merging candidate in the current prediction unit is not 0, the controller 26 may not add VSP indicating the view synthesis prediction merging candidate to extMergeCandList indicating the merge candidate list. Therefore, in this case, the view synthesis prediction merging candidate is not added to the merge candidate list for the current prediction unit. However, according to an embodiment, in a case where the view synthesis prediction merging candidate in the current prediction unit is available; the spatial merging candidate adjacent to the left side of the current prediction unit is available; and the corresponding spatial merging candidate has been reconstructed according to view synthesis prediction, even when the view synthesis prediction merging candidate does not exist in the merge candidate list, the controller 26 may determine the prediction mode of the current prediction unit as the view synthesis prediction.

Referring to FIG. 6B, in a case where N, which is information related to the merging candidate used in the current prediction unit, indicates A1 and thus it is determined that prediction is performed by using A1, which is the spatial merging candidate in the current prediction unit (63*b*); VspMcFlag[xPb−1][yPb+nPbH−1] indicates 1 and thus it is determined that the spatial merging candidate adjacent to the left side of the current prediction unit has been reconstructed according to view synthesis prediction (63*c*); and availableFlagVSP indicates 1 and thus it is determined that the view synthesis prediction merging candidate in the prediction unit is available (63*a*), the controller 26 may determine that the prediction is performed by using the view synthesis prediction merging candidate in the current prediction unit (63*d*). That is, when it is determined that A1, which is the spatial merging candidate A1 for the current prediction unit, has been reconstructed through view synthesis prediction, the controller 26 may determine to perform view synthesis prediction on the current prediction unit. Whether other spatial merging candidates A0, B0, B1, and B2 have been reconstructed according to view synthesis prediction is not determined, and whether A1 added first to the merge candidate list has been reconstructed according to view synthesis prediction is just checked. As a result, when A1 has been reconstructed according to view synthesis prediction, it is likely that the current prediction unit also has been encoded through view synthesis prediction. Thus, the controller 26 may determine the prediction mode as the view synthesis prediction. Accordingly, the efficiency of the image encoding may be increased through simplification of calculation in the image encoding apparatus 25.

According to an embodiment, the image encoding apparatus 25 may determines which one of merging candidates in the merge candidate list in the current prediction unit is efficient in terms of use, based on rate-distortion costs of merging candidates. According to an embodiment, a bitstream generator (not illustrated) of the image encoding apparatus 25 may generate a bitstream including information about the determined merging candidate in the merge candidate list.

According to an embodiment, in a case where the neighboring prediction unit is unavailable as the spatial merging candidate or the neighboring prediction unit has been encoded without using the view synthesis prediction merging candidate, the controller 26 of the image encoding apparatus 25 may perform an operation of adding the view synthesis prediction merging candidate to the merge candidate list after a first spatial merging candidate adjacent to the left side of the current prediction unit and a second spatial merging candidate adjacent to the upper end of the current prediction unit among the spatial merging candidates are added to the merge candidate list. In a case where the neighboring prediction unit is unavailable as the spatial merging candidate or the neighboring prediction unit has been encoded without using the view synthesis prediction merging candidate, the controller 26 may not generate the merge candidate list including the view synthesis prediction merging candidate instead of the spatial merging candidate related to the neighboring prediction unit, but may additionally add the view synthesis prediction merging candidate to the merge candidate list in the process of adding the spatial merging candidate to the merge candidate list. According to an embodiment, the view synthesis prediction merging candidate may be added after the first spatial merging candidate adjacent to the left side of the current prediction unit and the second spatial merging candidate adjacent to the upper end of the current prediction unit among the spatial merging candidates are added to the merge candidate list.

The controller 26 of the image encoding apparatus 25 may perform prediction according to the determined prediction mode. This process may correspond to the process in which the image decoding apparatus 20 performs prediction in operation S313. Since the process of encoding the image by performing the prediction has been described with reference to various embodiments and will be described in the following image encoding process, detailed description thereof will be omitted.

Figure 7:
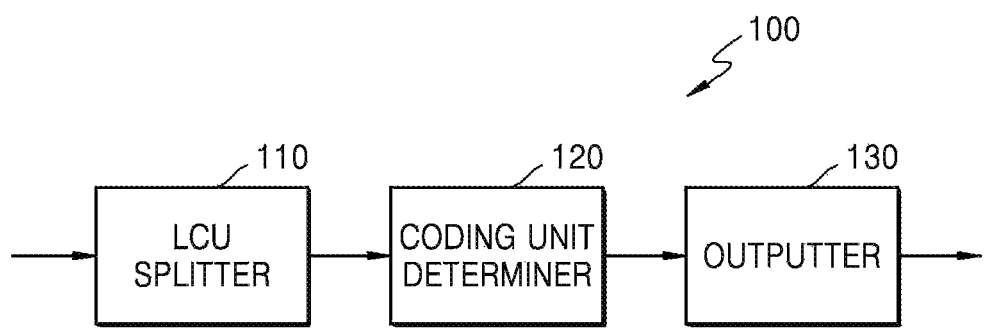
FIG. 7 illustrates a block diagram of a video encoding apparatus based on coding units of a tree structure.

FIG. 7 illustrates a block diagram of a video encoding apparatus based on coding units of a tree structure, according to an embodiment. The video encoding apparatus 100 of FIG. 7 may correspond to the image encoding apparatus 25 of FIG. 2B. Also, operations performed by a largest coding unit splitter 110 and a coding unit determiner 120 of FIG. 7 may be performed by the controller 26 of FIG. 2B, and an operation performed by an output unit 130 of FIG. 7 may be performed by the bitstream generator (not illustrated) of the image decoding apparatus 20 of FIG. 2B.

The video encoding apparatus 100 involving video prediction based on coding units of the tree structure includes a coding unit determiner 120 and an output unit 130. Hereinafter, for convenience of description, the video encoding apparatus involving video prediction based on coding units of the tree structure is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the least encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. A partition obtained by splitting a prediction unit may include a coding unit and a data unit obtained by splitting at least one selected from a height and a width of the coding unit. A partition may include a data unit where a coding unit is split and a data unit having the same size as the coding unit. A partition that is a base of prediction may be referred to as a prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 8:
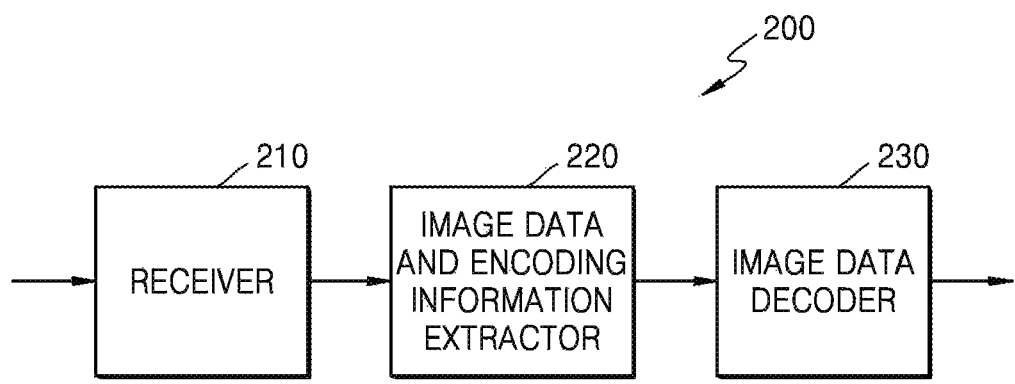
FIG. 8 illustrates a block diagram of a video decoding apparatus based on coding units of a tree structure.

FIG. 8 illustrates a block diagram of a video decoding apparatus 200 based on coding units of a tree structure, according to various embodiments. The video decoding apparatus 200 of FIG. 8 may correspond to the image decoding apparatus 20 of FIG. 1A. Also, operations performed by an image data and encoding information extractor 220 and an image data decoder 230 of FIG. 8 may be performed by the controller 21 of FIG. 1A, and an operation performed by a receiver 210 of FIG. 8 may be performed by the information obtainer (not illustrated) included in the image decoding apparatus 20 of FIG. 1A.

The video decoding apparatus 200 involving video prediction based on coding units of the tree structure according to the embodiment includes a receiver 210, an image data and encoding information extractor 220, and an image data decoder 230. Hereinafter, for convenience of description, the video decoding apparatus 200 involving video prediction based on coding units of the tree structure according to the embodiment is referred to as the 'video decoding apparatus 200'.

Definitions of various terms, such as a coding unit, a depth, a prediction unit, a transformation unit, and various types of split information for decoding operations of the video decoding apparatus 200 according to the embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bit stream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

As such, the current coding unit may be decoded by obtaining the information about the encoding mode for each coding unit.

The image decoding apparatus 20 described above with reference to FIG. 2A may include the video decoding apparatuses 200 corresponding to the number of views, so as to reconstruct first layer images and second layer images by decoding a received first layer image stream and a received second layer image stream.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 9:
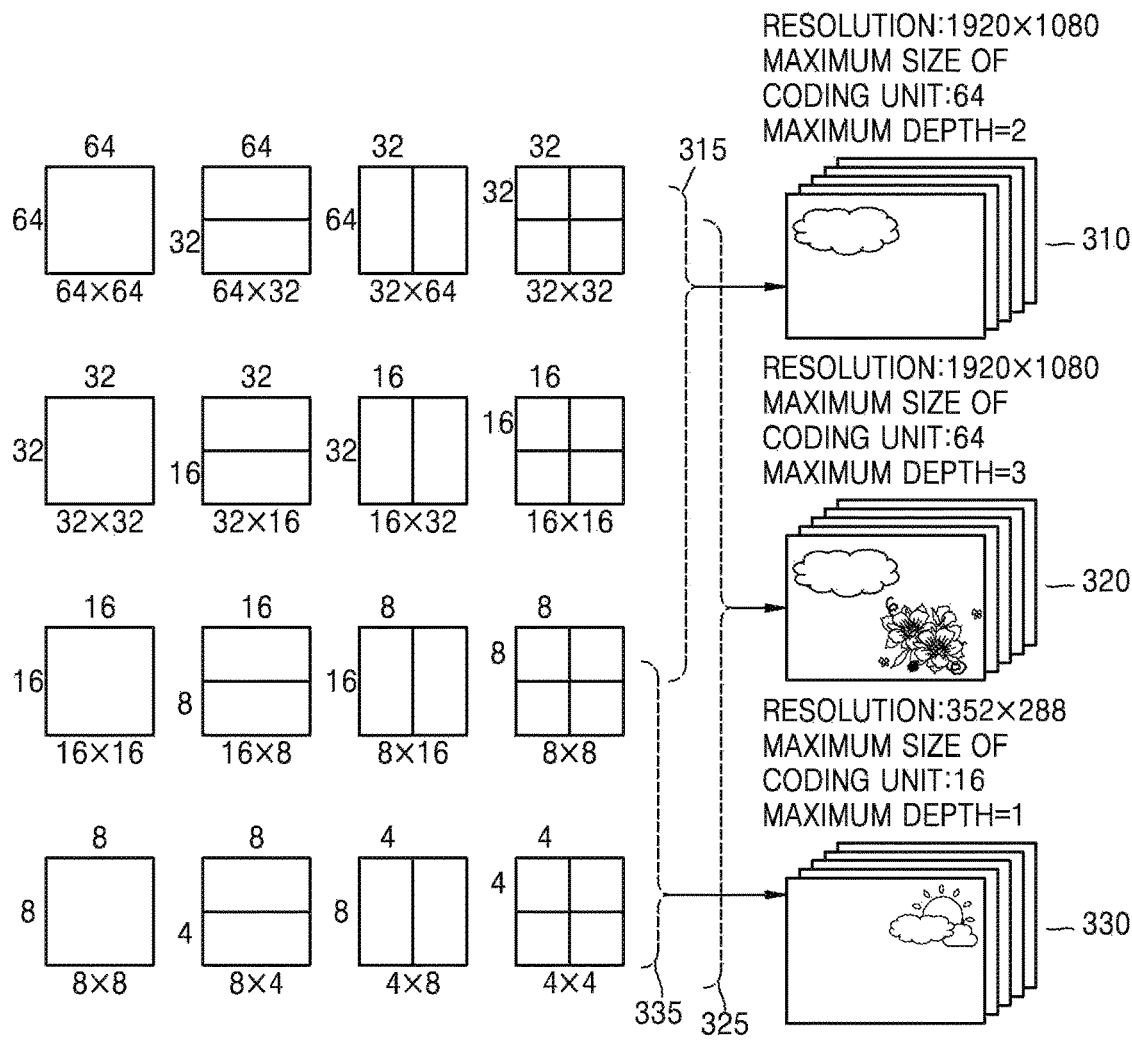
FIG. 9 illustrates a concept of coding units.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1220×1080, a maximum size of a coding unit is 64, and a maximum depth is 2. In video data 320, a resolution is 1220×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10:
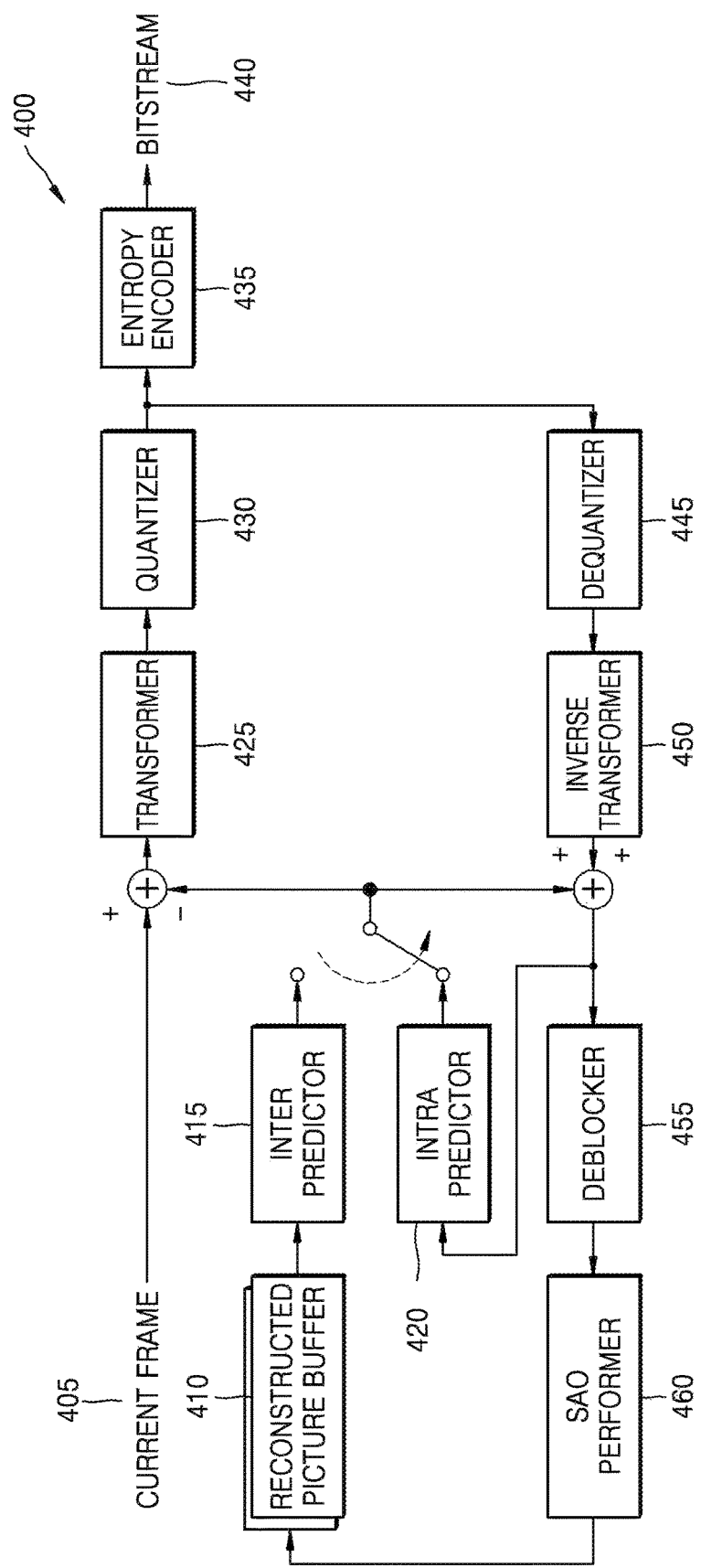
FIG. 10 illustrates a block diagram of an image encoder based on coding units.

FIG. 10 illustrates a block diagram of an image encoder 400 based on coding units, according to various embodiments.

The image encoder 400 according to an embodiment performs operations of a the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current image 405 may be split into largest coding units and then the largest coding units may be sequentially encoded. In this regard, the largest coding units that are to be split into coding units having a tree structure may be encoded.

Residue data is generated by removing prediction data regarding a coding unit of each mode which is output from the intra predictor 420 or the inter predictor 415 from data regarding an encoded coding unit of the current image 405, and the residue data is output as a quantized transformation coefficient according to transformation units through a transformer 425 and a quantizer 430. The quantized transformation coefficient is reconstructed as the residue data in a spatial domain through an inverse-quantizer 445 and an inverse-transformer 450. The reconstructed residual image data in the spatial domain is added to prediction data for the coding unit of each mode which is output from the intra predictor 420 or the inter predictor 415 and thus is reconstructed as data in a spatial domain for a coding unit of the current image 405. The reconstructed data in the spatial domain is generated as a reconstructed image through a deblocking unit 455 and an SAO performer 460 and the reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 11:
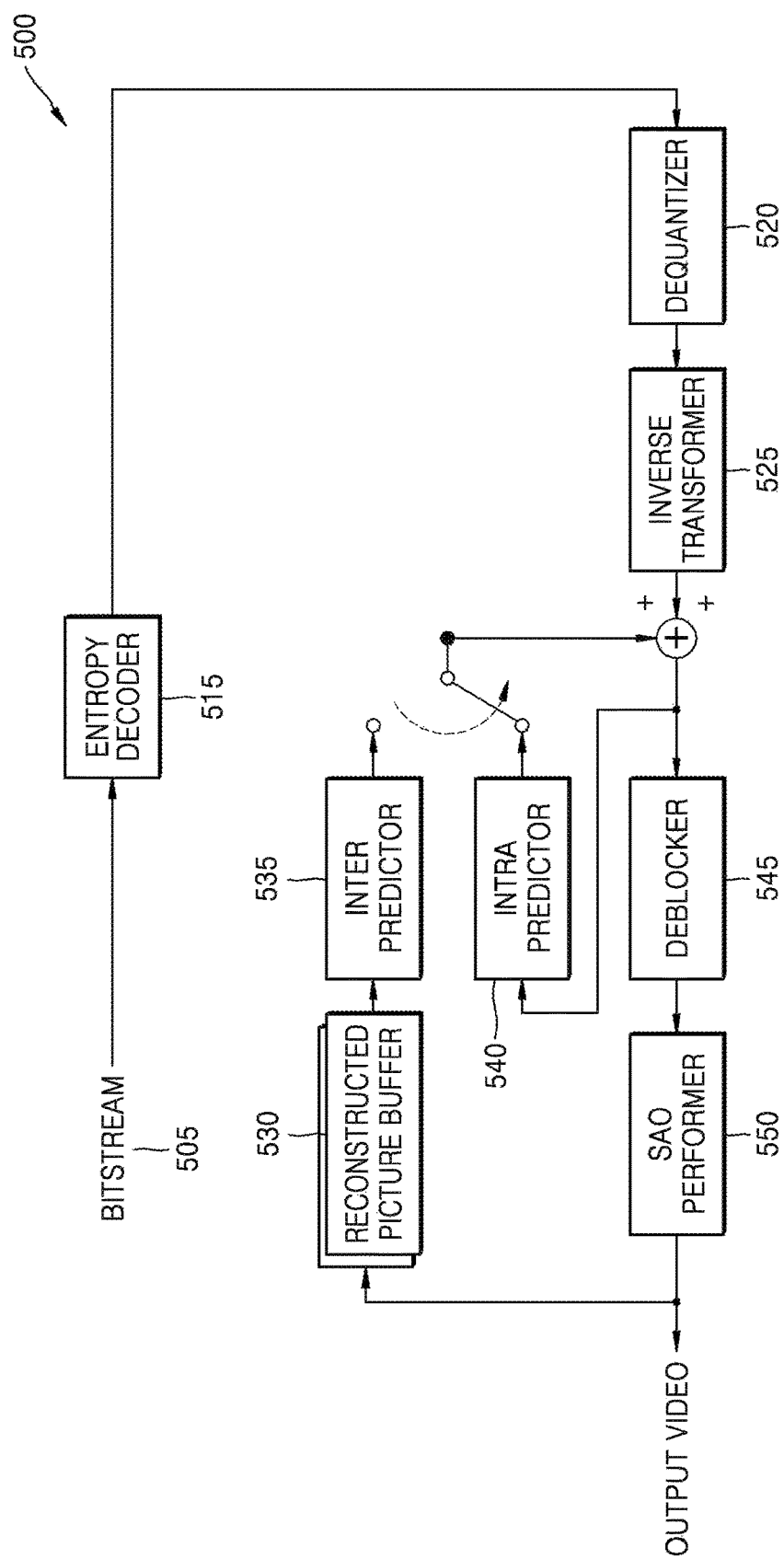
FIG. 11 illustrates a block diagram of an image decoder based on coding units.

FIG. 11 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Reconstructed images stored in the reconstructed picture buffer 530 may be output as reference images.

In order for a image data decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quad tree in each coding unit.

The encoding operation of FIG. 10 and the decoding operation of FIG. 11 are described as a video stream encoding operation and a video stream decoding operation, respectively, in a single layer. Thus, if the image encoding apparatus 25 of FIG. 2B encodes a video stream of two or more layers, the image encoder 400 may be provided for each layer. Similarly, if the decoding apparatus 30 of FIG. 2A decodes a video stream of two or more layers, the image decoder 500 may be provided for each layer.

Figure 12:
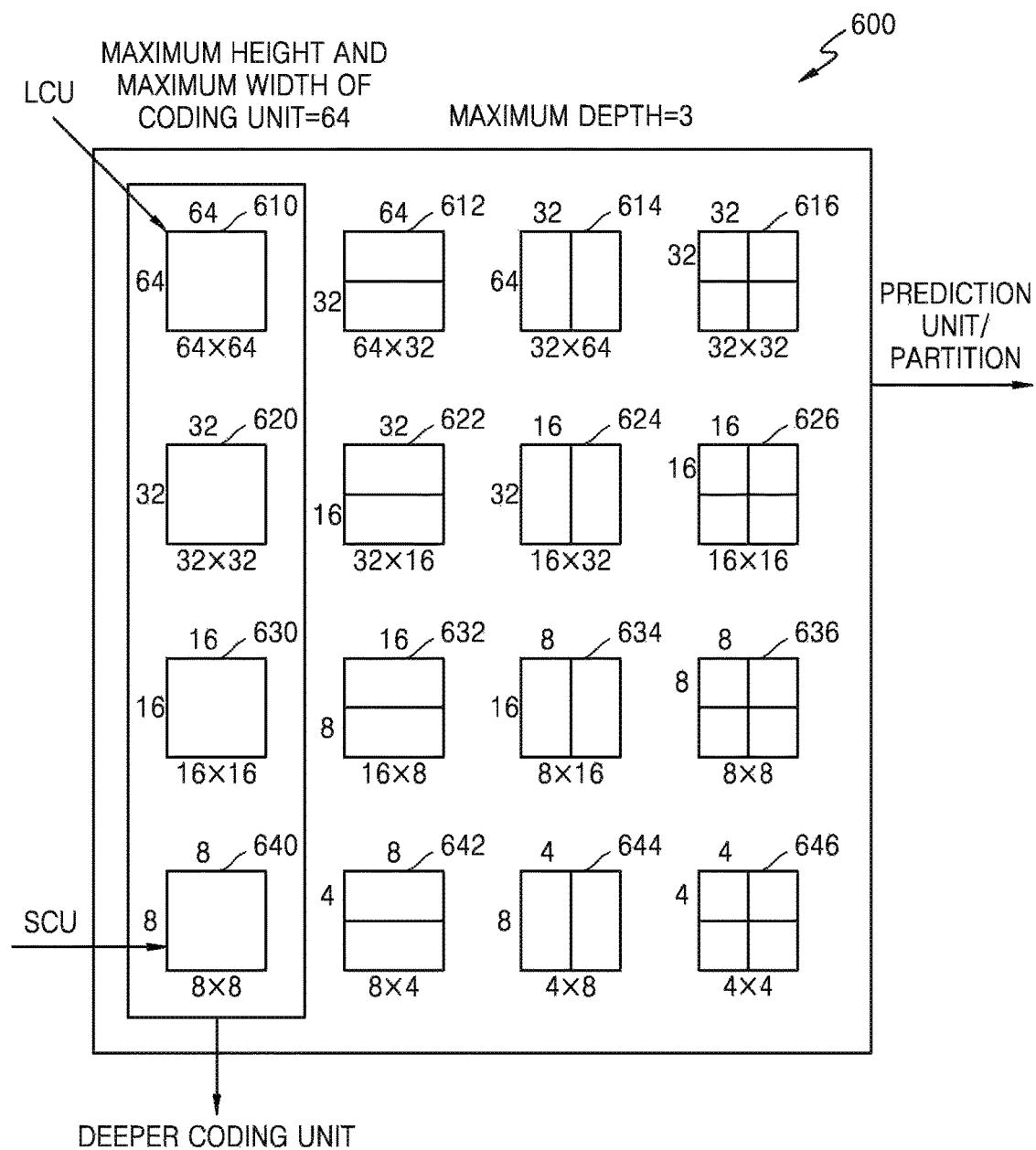
FIG. 12 illustrates deeper coding units according to depths, and partitions.

FIG. 12 illustrates deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 13:
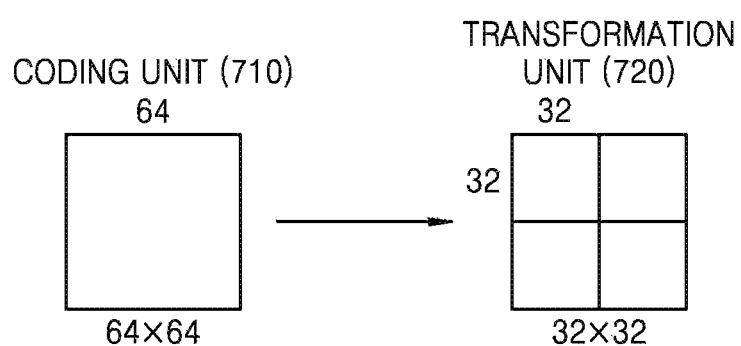
FIG. 13 illustrates a relationship between a coding unit and transformation units.

FIG. 13 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 14:
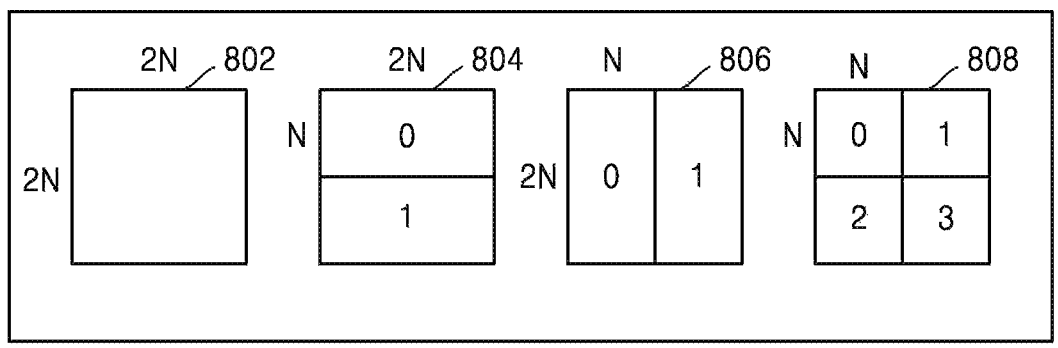
FIG. 14 illustrates a plurality of pieces of encoding information according to depths.
Figure 14:
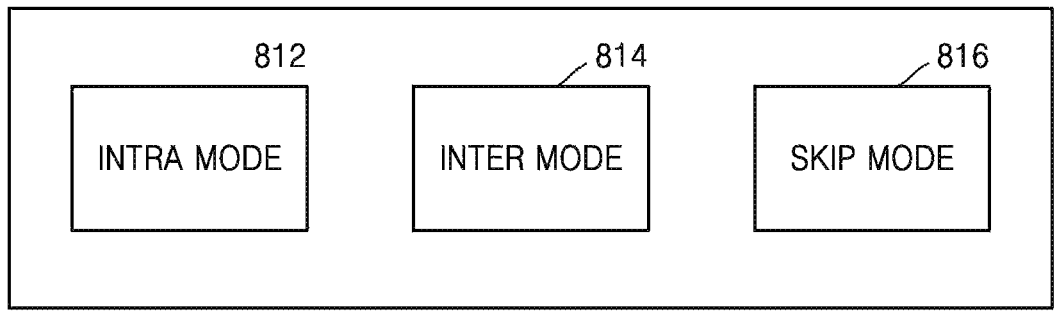
Figure 14:
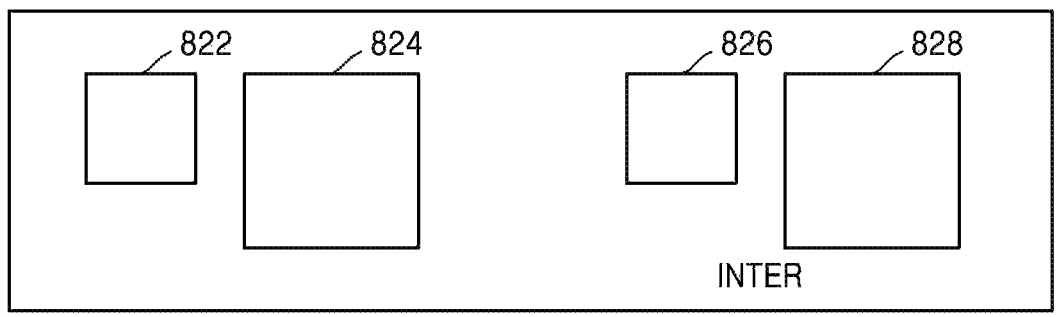

FIG. 14 illustrates a plurality of pieces of encoding information according to depths, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 220 of the video decoding apparatus 200 may extract and use the partition mode information 800, the prediction mode information 810, and the transformation unit size information 820 for decoding, according to each deeper coding unit.

Figure 15:
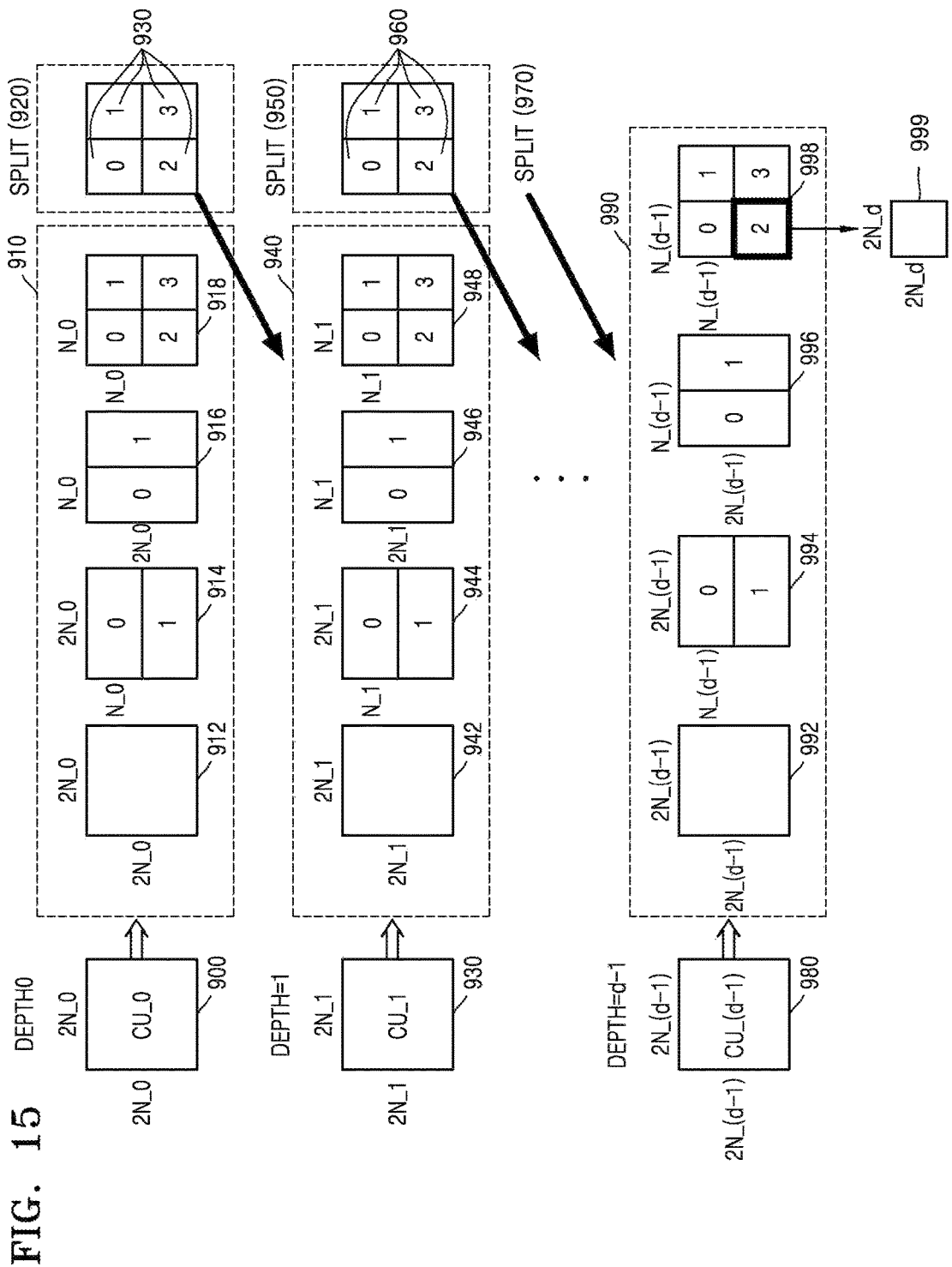
FIG. 15 illustrates deeper coding units according to depths.

FIG. 15 illustrates deeper coding units according to depths, according to various embodiments.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d-1, and split information may be set until when a depth corresponds to d-2. That is, when encoding is performed up to when the depth is d-1 after a coding unit corresponding to a depth of d-2 is split (in operation 970), a prediction unit 990 for prediction encoding a coding unit 980 having a depth of d-1 and a size of 2N_(d-1)×2N_(d-1) may include partitions of a partition mode 992 having a size of 2N_(d-1)×2N_(d-1), a partition mode 994 having a size of 2N_(d-1)×N_(d-1), a partition mode 996 having a size of N_(d-1)×2N_(d-1), and a partition mode 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition modes so as to search for a partition mode generating a minimum encoding error.

Even when the partition mode 998 having the size of N_(d-1)×N_(d-1) has the minimum encoding error, since a maximum depth is d, a coding unit CU_(d-1) having a depth of d-1 is no longer split into a lower depth, and a depth for the coding units constituting a current largest coding unit 900 is determined to be d-1 and a partition mode of the current largest coding unit 900 may be determined to be N_(d-1)×N_(d-1). Also, since the maximum depth is d, split information for a coding unit 952 having a depth of d-1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d-1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 900. The video decoding apparatus 200 according to the embodiment may determine a depth, in which split information is '0', as a depth by using split information according to depths, and may use, for decoding, split information about the corresponding depth.

Figure 16:
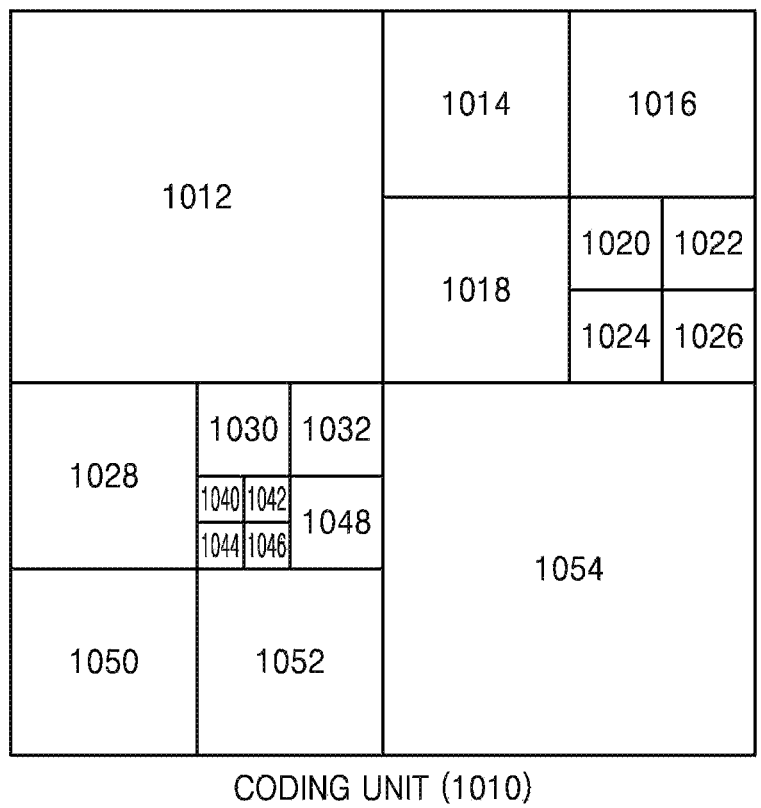
FIGS. 16, 17, and 18 illustrate a relationship between coding units, prediction units, and transformation units.
Figure 17:
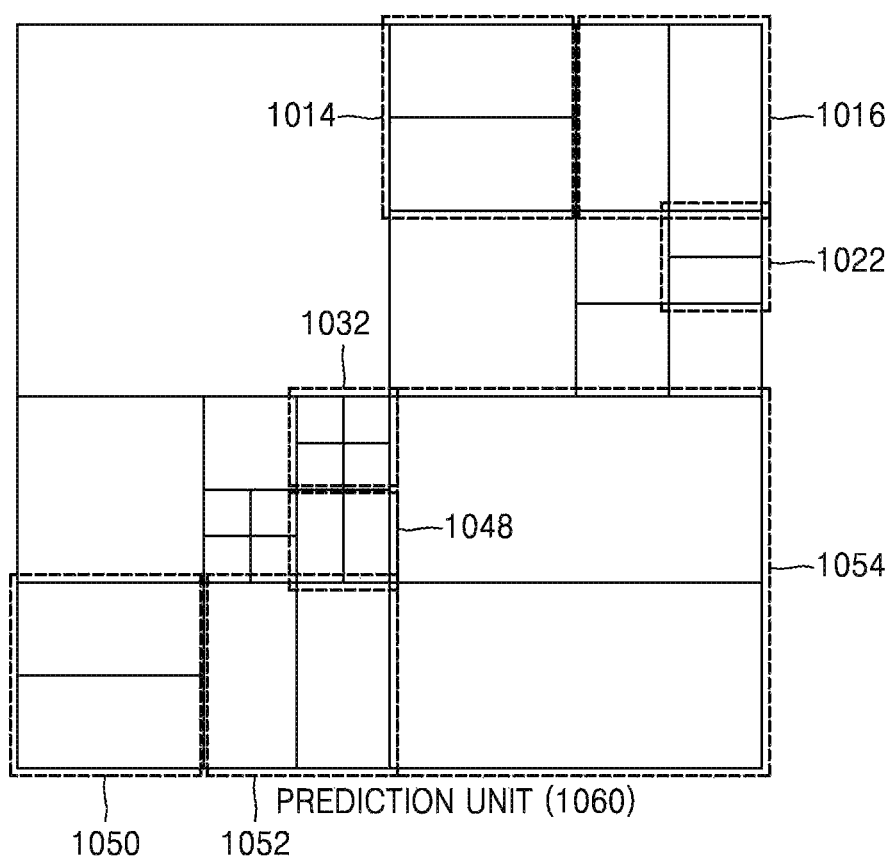
Figure 18:
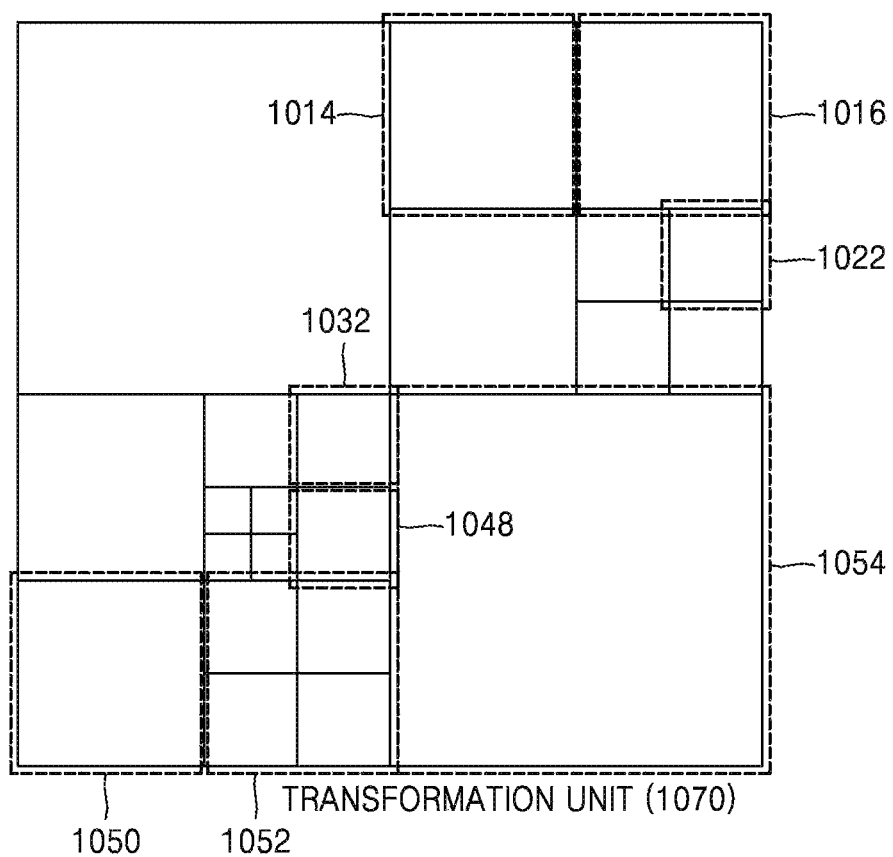

FIGS. 16, 17, and 18 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

| Split Information 0 (Encoding on Coding Unit having Size of 2Nx2N and Current Depth of d) | | | | | Split Information 1 |
|---|---|---|---|---|---|
| Prediction Mode | Partition Mode | | Size of Transformation Unit | | |
| | Symmetrical Partition Mode | Asymmetrical Partition Mode | Split Information 0 of Transformation Unit | Split Information 1 of Transformation Unit | Repeatedly Encode Coding Units having Lower Depth of d + 1 |
| Intra Inter Skip (Only 2Nx2N) | 2Nx2N 2NxN Nx2N NxN | 2NxnU 2NxnD nLx2N nRx2N | 2Nx2N | NxN (Symmetrical Partition Mode) | |

TABLE 1-continued

Split Information 0
(Encoding on Coding Unit having Size of 2N×2N and Current Depth of d)

| Prediction Mode | Partition Mode | Size of Transformation Unit | Split Information 1 |
|---|---|---|---|
| | | N/2×N/2 (Asymmetrical Partition Mode) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 19:
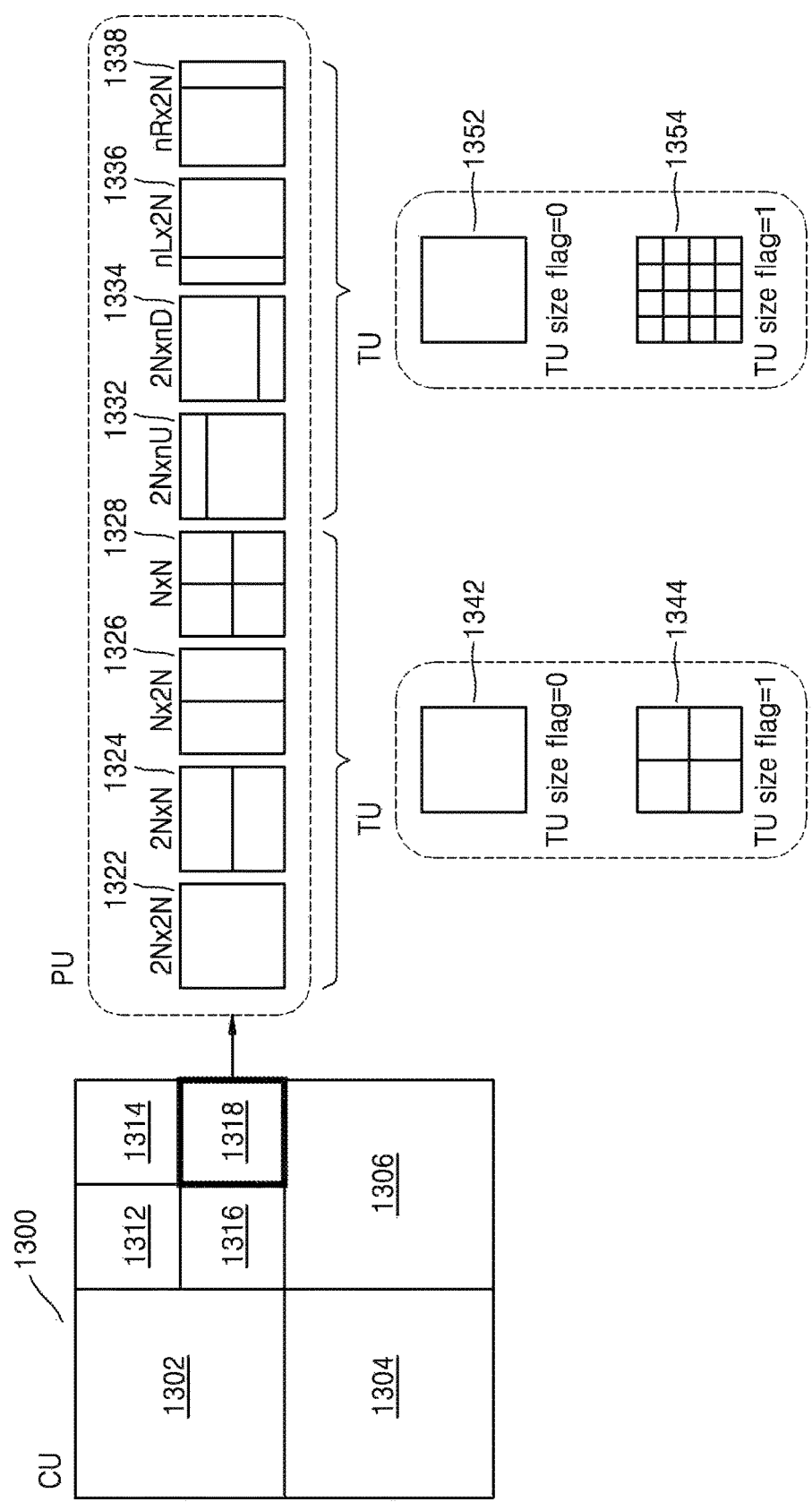
FIG. 19 illustrates a relationship between a coding unit, a prediction unit, and a transformation unit, according to encoding mode information of Table 1.

FIG. 19 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 19 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be used as an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize}, \text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 7 through 19, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the image encoding methods and/or the video encoding method, which are described with reference to FIGS. 1A through 19, will be collectively referred to as 'the video encoding method'. Also, the image decoding methods and/or the video decoding method, which are described with reference to FIGS. 1A through 19, will be collectively referred to as 'the video decoding method'.

Also, a video encoding apparatus including the image encoding apparatus 40, the video encoding apparatus 100, or the image encoder 400 which are described with reference to FIGS. 1A through 19 will be collectively referred to as a 'video encoding apparatus'. Also, a video decoding apparatus including the image decoding apparatus 20, the video decoding apparatus 200, or the image decoder 500 which are described with reference to FIGS. 1A through 19 will be collectively referred to as a 'video decoding apparatus'.

The non-transitory computer-readable recording medium such as a disc 26000 that stores the programs according to an embodiment will now be described in detail.

Figure 20:
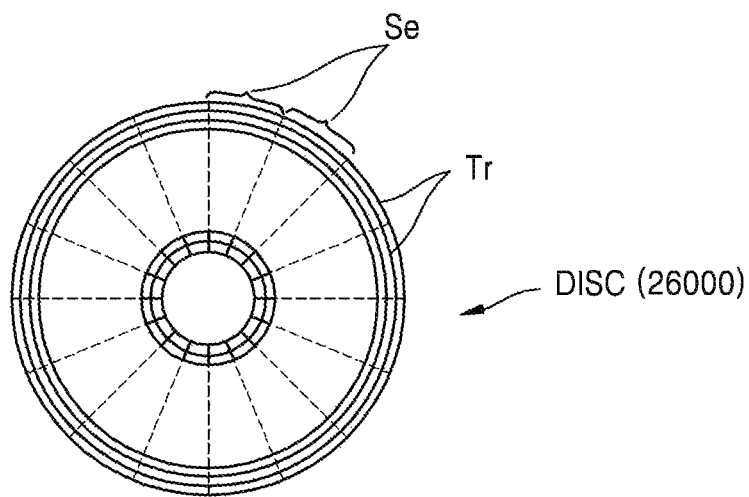
FIG. 20 illustrates a physical structure of a disc in which a program is stored.

FIG. 20 illustrates a physical structure of the disc 26000 in which a program is stored, according to various embodiments. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 21:
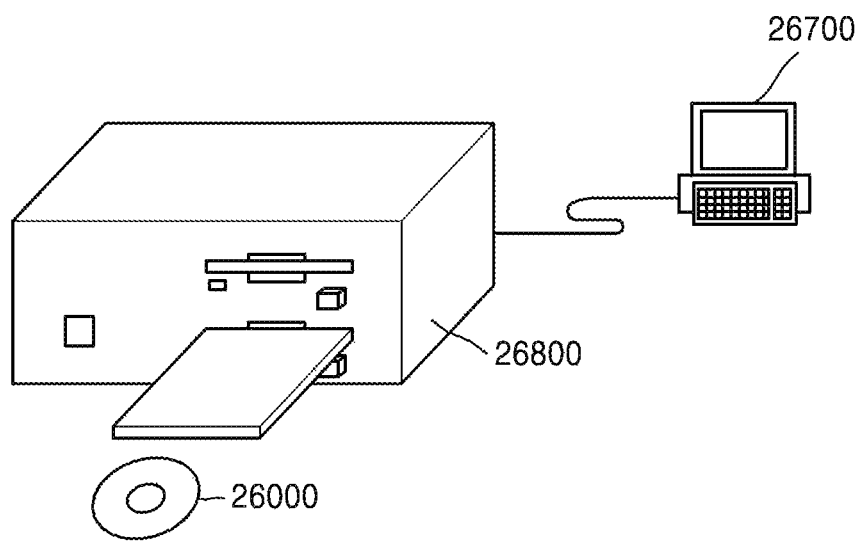
FIG. 21 illustrates a disc drive for recording and reading a program by using the disc.

FIG. 21 illustrates a disc drive 26100 for recording and reading a program by using the disc 26000. A computer system 26700 may store a program that executes at least one of the video encoding method and the video decoding method according to an embodiment, in the disc 26000 via the disc drive 26100. In order to run the program stored in the disc 26000 in the computer system 26700, the program may be read from the disc 26000 and may be transmitted to the computer system 26700 by using the disc drive 26100.

The program that executes at least one of the video encoding method and the video decoding method according to an embodiment may be stored not only in the disc 26000 illustrated in FIGS. 20 and 21 but may also be stored in a memory card, a ROM cassette, or a solid state drive (SSD).

A system to which the video encoding method and the video decoding method according to the embodiments described above are applied will be described below.

Figure 22:
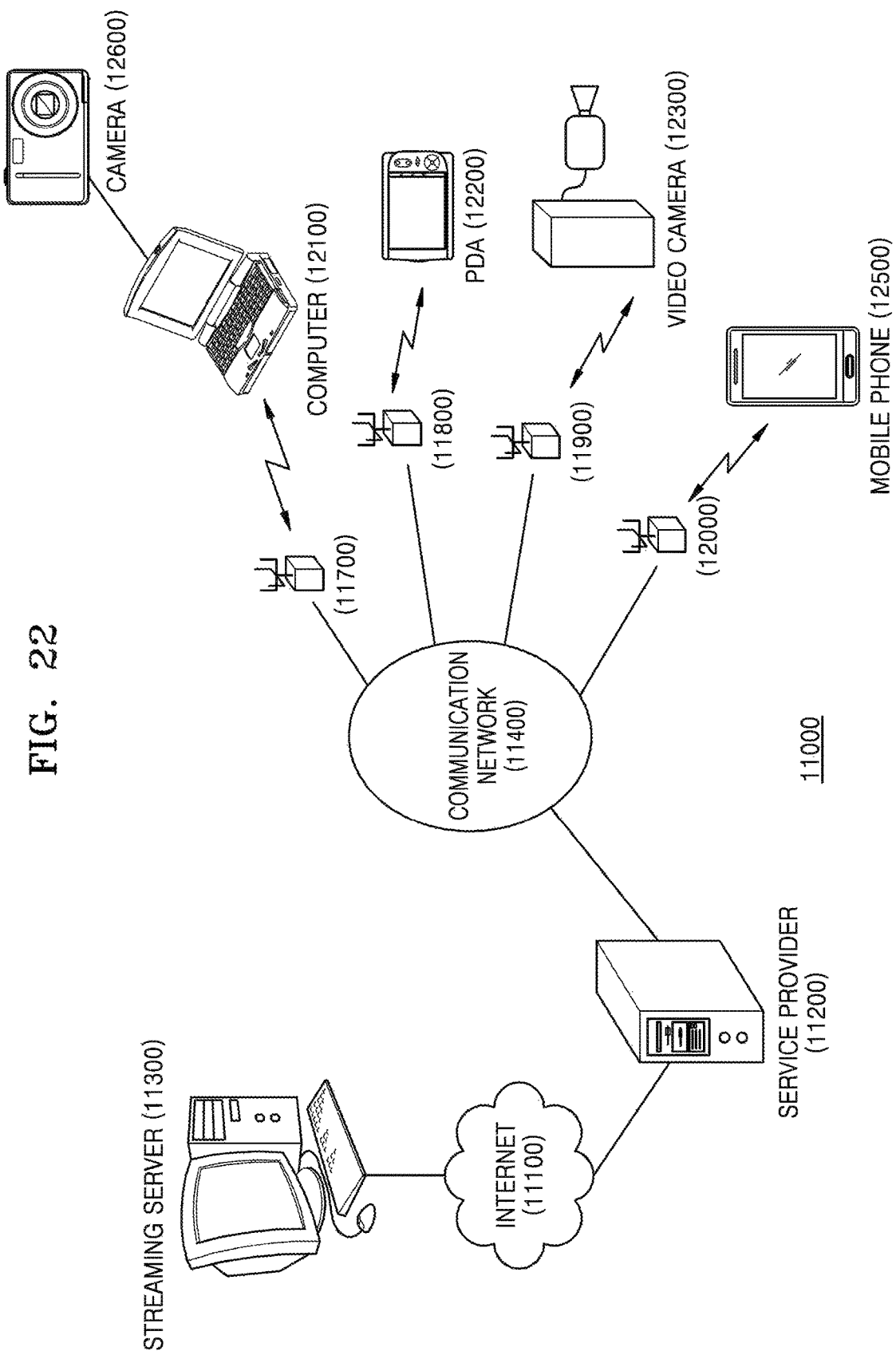
FIG. 22 illustrates an overall structure of a content supply system for providing a content distribution service.

FIG. 22 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

Figure 23:
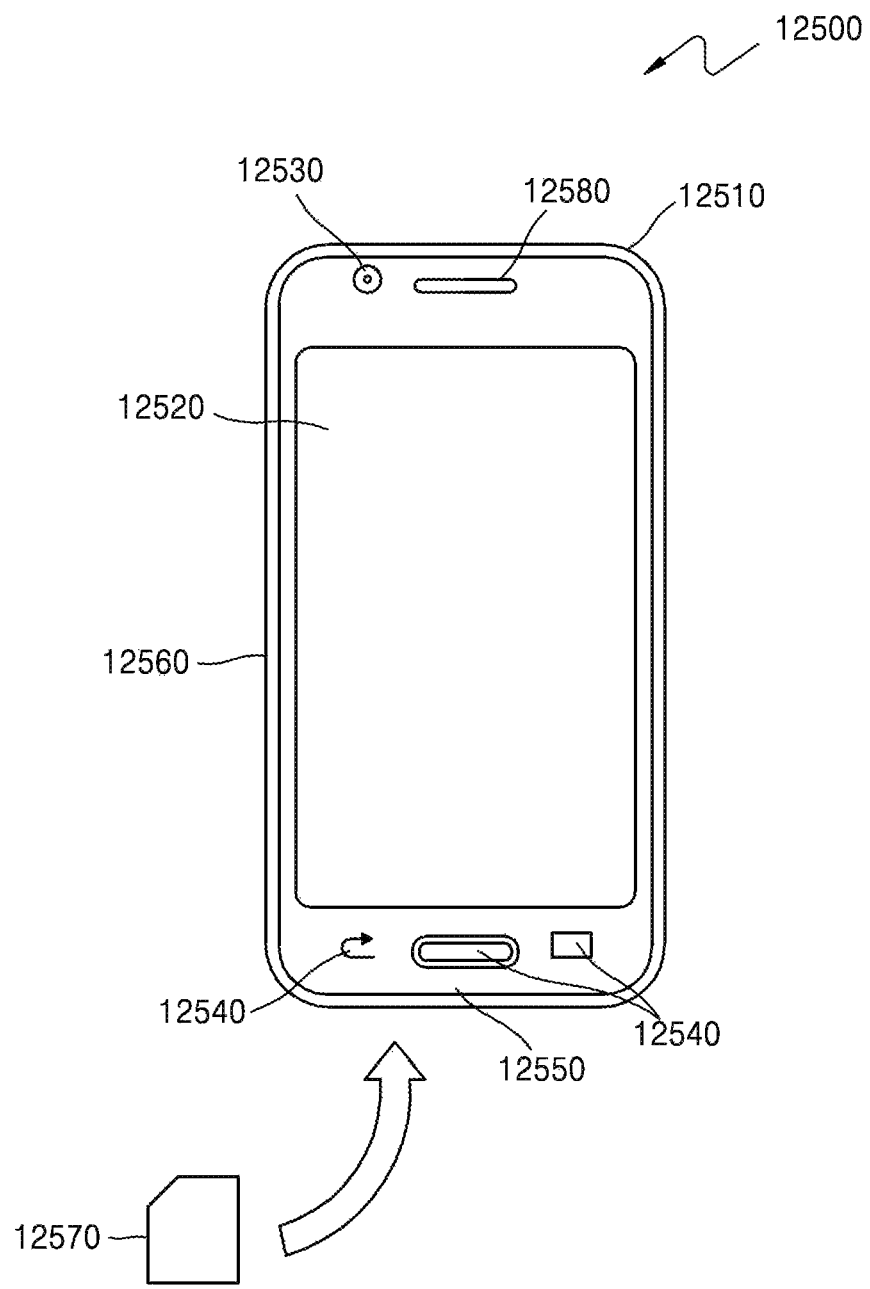
FIGS. 23 and 24 illustrate external and internal structures of a mobile phone to which a video encoding method and a video decoding method are applied.
Figure 24:
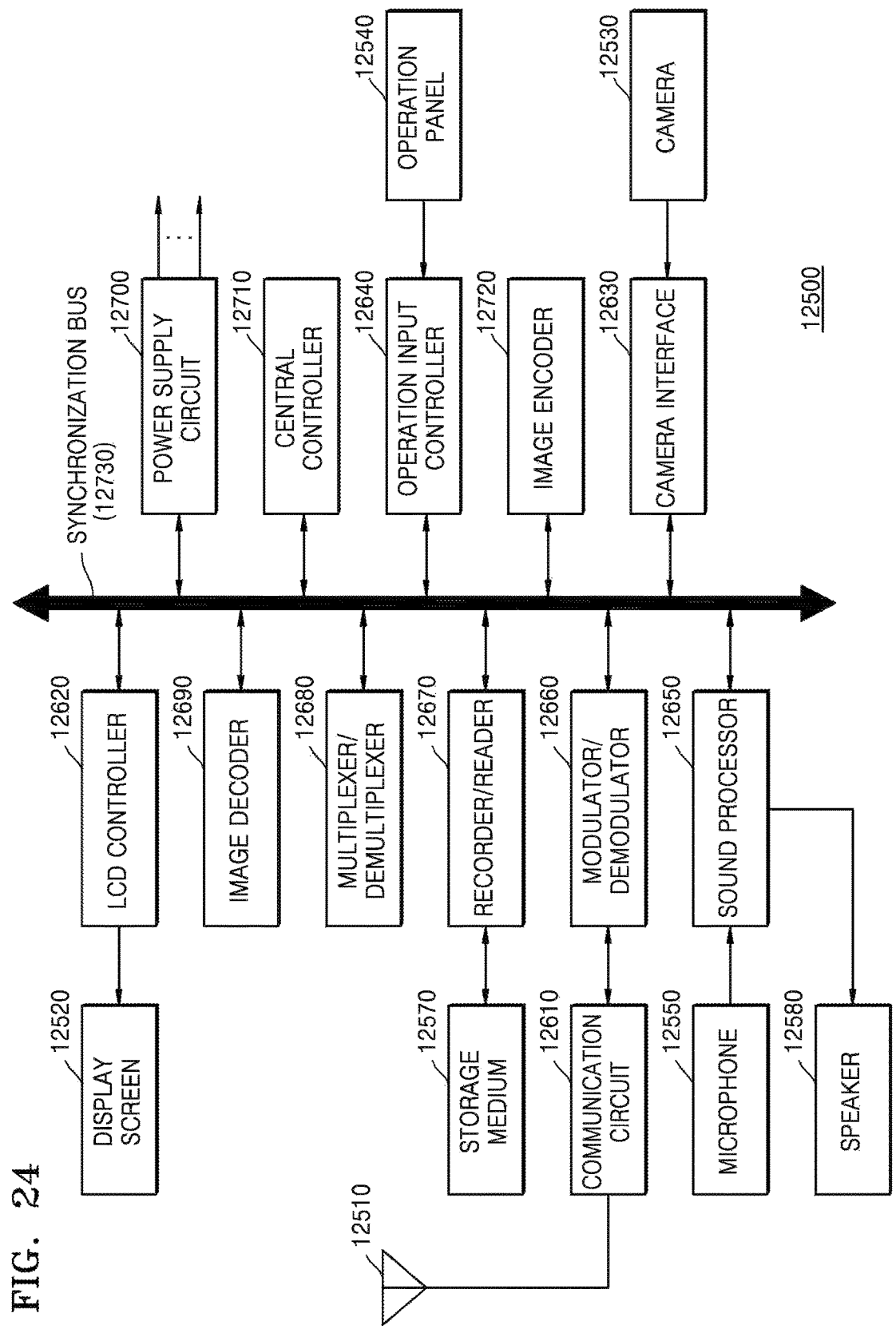

With reference to FIGS. 23 and 24, the mobile phone 12500 included in the content supply system 11000 according to an embodiment will now be described in detail.

FIG. 23 illustrates an external structure of the mobile phone 12500 to which the video encoding method and the video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways;

and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 24 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650, by control of the central controller 12710. The digital sound signal may be converted to a transmission signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12710 via the operation input controller 12640. By the control of the central controller 12710, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 according to an embodiment. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus according to an embodiment, may be a transmitting terminal including only the video encoding apparatus according to an embodiment, or may be a receiving terminal including only the video decoding apparatus according to an embodiment.

Figure 25:
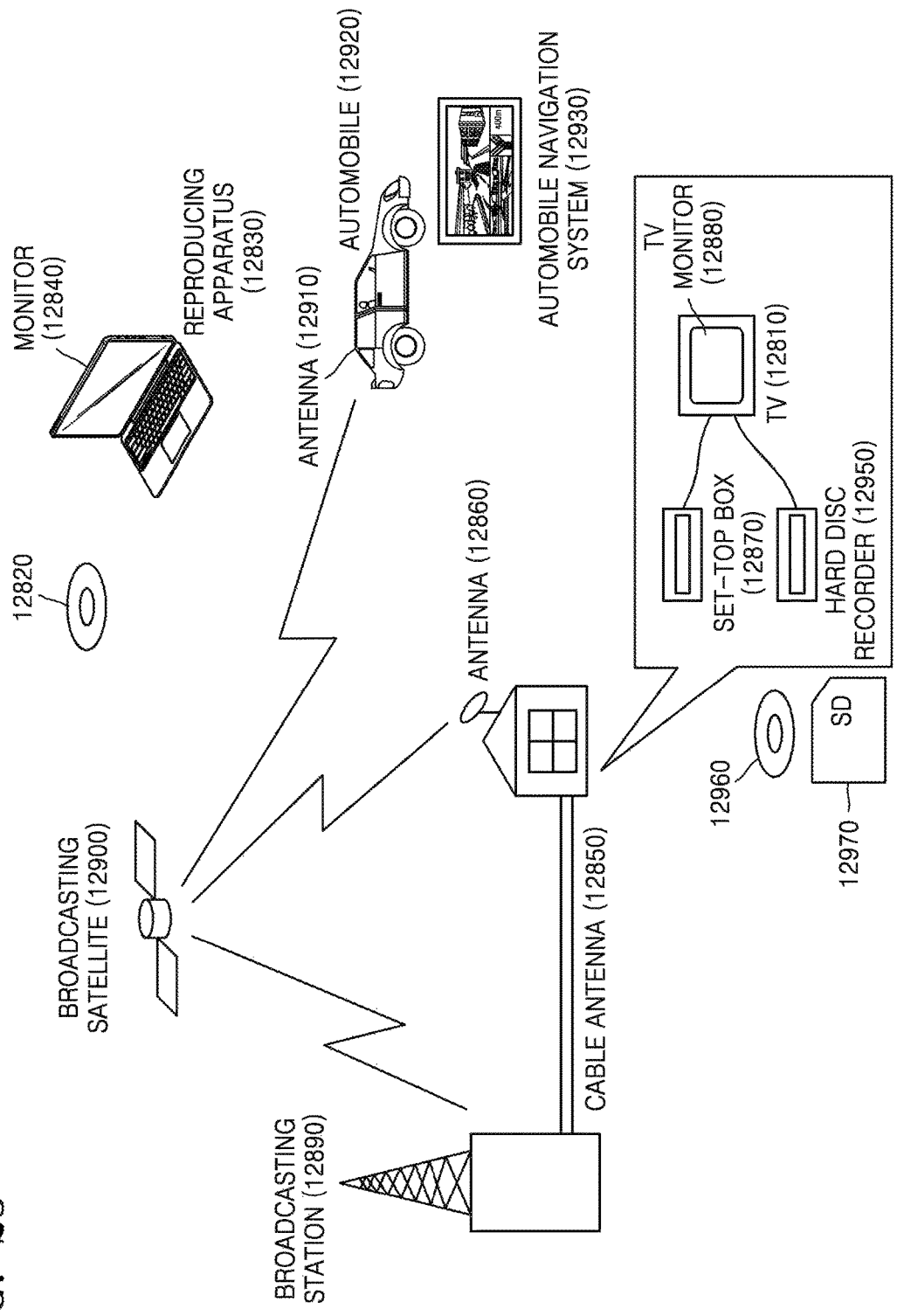
FIG. 25 illustrates a digital broadcasting system employing a communication system.

A communication system according to an embodiment is not limited to the communication system described above with reference to FIG. 24. For example, FIG. 25 illustrates a digital broadcasting system employing a communication system, according to various embodiments. The digital broadcasting system of FIG. 25 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to an embodiment is implemented in a reproducing apparatus 12130, the reproducing apparatus 12130 may parse and decode an encoded video stream recorded on a storage medium 12120, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to an embodiment may be installed. Data output from the set-top box 12870 may also be reproduced on a TV monitor 12880.

As another example, the video decoding apparatus according to an embodiment may be installed in the TV receiver 12810 instead of the set-top box 12870.

An automobile 12220 that has an appropriate antenna 12210 may receive a signal transmitted from the satellite 12900 or the wireless base station 11700. A decoded video may be reproduced on a display screen of an automobile navigation system 12230 installed in the automobile 12220.

A video signal may be encoded by the video encoding apparatus according to an embodiment and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to an embodiment, a video signal recorded on the DVD disc 12960, the SD card 12970, or another storage medium may be reproduced on the TV monitor 12880.

Figure 26:
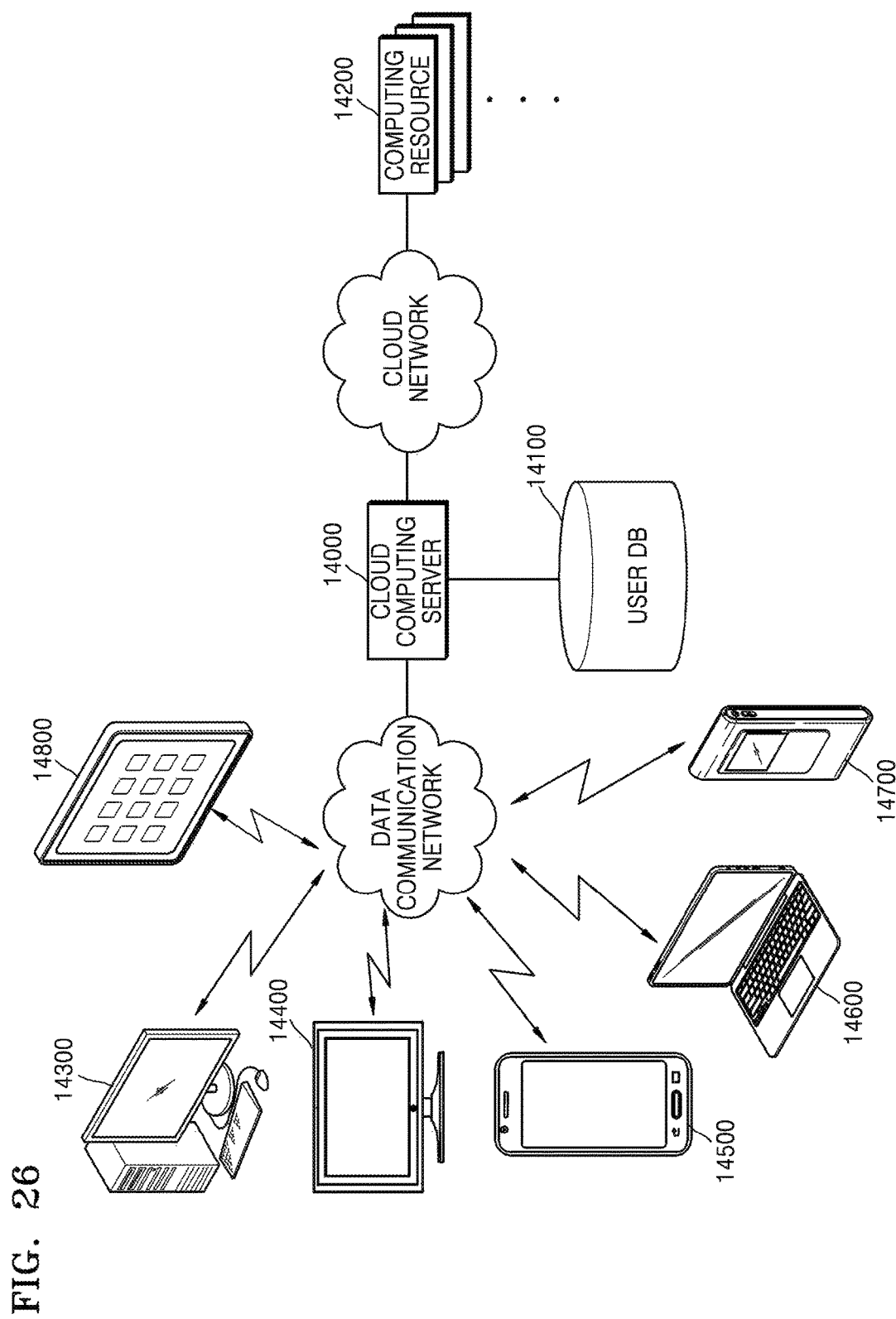
FIG. 26 illustrates a network structure of a cloud computing system using the video encoding apparatus and the video decoding apparatus.

The automobile navigation system 12230 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

FIG. 26 illustrates a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

Here, the user terminal may include the video decoding apparatus according to an embodiment as described above with reference to FIGS. 1A through 19. As another example, the user terminal may include the video encoding apparatus according to an embodiment as described above with reference to FIGS. 1A through 20. Alternatively, the user terminal may include both the video encoding apparatus and the video decoding apparatus according to an embodiment as described above with reference to FIGS. 1A through 19.

Various applications of the image encoding method, the image decoding method, the image encoding apparatus, and the image decoding apparatus described above with reference to FIGS. 1A through 19 are described above with reference to FIGS. 20 through 26. However, various embodiments of methods of storing the video encoding method and the video decoding method in a storage medium or various embodiments of methods of implementing the video encoding apparatus and the video decoding apparatus in a device described above with reference to FIGS. 1A through 19 are not limited to the embodiments of FIGS. 20 through 26.

While the present disclosure has been particularly shown and described with reference to embodiments thereof, it will be understood by one of ordinary skill in the art that various changes in form and details may be made therein without departing from the spirit and scope of the following claims. Therefore, the scope of the present disclosure is defined not by the detailed description of the present disclosure but by the appended claims, and all differences within the scope will be construed as being included in the present disclosure.

The invention claimed is:

1. An image decoding method, performed by a decoding apparatus comprising a processor, the method comprising:
   determining at least one prediction unit included in a current coding unit that is one of at least one coding unit splitting the image;
   generating a merge candidate list related to a current prediction unit included in the at least one prediction unit;
   determining a prediction mode to be performed in the current prediction unit based on the merge candidate list;
   performing prediction according to the determined prediction mode: and
   reconstructing the current prediction unit based on the prediction results,
   wherein the generating of the merge candidate list further comprises:
      adding a neighboring prediction unit adjacent to the current prediction unit to the merge candidate list based on a fist information indicating availability of the neighboring prediction unit as a spatial merging candidate; and
      determining whether to add a view synthesis prediction merging candidate to the merge candidate list based on the first information indicating the availability of the neighboring prediction unit as the spatial merging candidate, a second information indicating availability of the view synthesis prediction merging candidate for the current prediction unit and a third information indicating whether the neighboring prediction unit is coded according to a view synthesis prediction,
   wherein the prediction mode to be performed in the current prediction unit is determined as the view synthesis prediction when it is determined the view synthesis prediction merging candidate is available for the current prediction unit based on the second information, it is determined the neighboring prediction unit is coded according to the view synthesis prediction based on the third information and it is determined a merge candidate to be used for the current prediction unit is the neighboring prediction unit.

2. The image decoding method of claim 1, wherein the neighboring prediction unit is adjacent to a left side of the current prediction unit among spatial merging candidates.

3. The image decoding method of claim 1, wherein, when it is determined the view synthesis prediction merging candidate is available for the current prediction unit and when the neighboring prediction unit is unavailable as the spatial merging candidate or the neighboring prediction unit is not coded according to the view synthesis prediction, generating the merge candidate list including the view synthesis prediction merging candidate.

4. The image decoding method of claim 3, wherein, when it is determined the view synthesis prediction merging candidate is available for the current prediction unit and when the neighboring prediction unit is unavailable as the spatial merging candidate or the neighboring prediction unit is not coded according to the view synthesis prediction, adding the view synthesis prediction merging candidate to the merge candidate list after the neighboring prediction unit adjacent to a left side of the current prediction unit and a neighboring prediction unit adjacent to an upper end of the current prediction unit among spatial merging candidates are added to the merge candidate list.

5. An image decoding apparatus comprising a processor, the apparatus comprising:
   a decoder configured to determine at least one prediction unit included in a current coding unit that is one of at least one coding unit splitting the image, generate a merge candidate list related to a current prediction unit included in the at least one prediction unit, determine a prediction mode to be performed in the current prediction unit based on the merge candidate list, perform prediction according to the determined prediction mode and reconstruct the current prediction unit based on the prediction results,
   wherein the decoder is further configured to:
      add a neighboring prediction unit adjacent to the current prediction unit to the merge candidate list based on a first information indicating availability of the neighboring prediction unit as a spatial merging candidate; and
      determine Whether to add a view synthesis prediction merging candidate to the merge candidate list based on the first information indicating the availability of the neighboring prediction unit as the spatial merging candidate, a second information indicating availability of the view synthesis prediction merging candidate for the current prediction unit and a third information indicating whether the neighboring prediction unit is coded according to a view synthesis prediction,
   wherein the decoder is further configured to determine the prediction mode to be performed in the current prediction unit as the view synthesis prediction when it is determined the view synthesis prediction merging candidate is available for the current prediction unit based on the second information, it is determined the neighboring prediction unit is coded according to the view synthesis prediction based on the third information and it is determined a merge candidate to be used for the current prediction unit is the neighboring prediction unit.

6. The image decoding apparatus of claim 5, wherein the neighboring prediction unit is adjacent to a left side of the current prediction unit among spatial merging candidates.

7. The image decoding apparatus of claim 5, wherein, when it is determined the view synthesis prediction merging candidate is available for the current prediction unit and when the neighboring prediction unit is unavailable as the spatial merging candidate or the neighboring prediction unit is not coded according to the view synthesis prediction, the decoder is further configured to generate the merge candidate list including the view synthesis prediction merging candidate.

8. The image decoding apparatus of claim 7, wherein, when it is determined the view synthesis prediction merging candidate is available for the current prediction unit and when the neighboring prediction unit is unavailable as the spatial merging candidate or the neighboring prediction unit is not coded according to the view synthesis prediction, the decoder is further configured to add the view synthesis prediction merging candidate to the merge candidate list after the neighboring prediction unit adjacent to a left side of the current prediction unit and a neighboring prediction unit adjacent to an upper end of the current prediction unit among spatial merging candidates are added to the merge candidate list.

9. A non-transitory computer-readable recording medium having recorded thereon a program for performing the image decoding method of claim 1.

* * * * *